United States Patent
Munich et al.

(10) Patent No.: US 11,966,227 B2
(45) Date of Patent: Apr. 23, 2024

(54) MAPPING FOR AUTONOMOUS MOBILE ROBOTS

(71) Applicant: iRobot Corporation, Bedford, MA (US)

(72) Inventors: Mario Munich, Bedford, MA (US); Andreas Kolling, Pasadena, CA (US); Manjunath Narayana, Pasadena, CA (US); Philip Fong, South Pasadena, CA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 17/671,183

(22) Filed: Feb. 14, 2022

(65) Prior Publication Data

US 2022/0269275 A1    Aug. 25, 2022

Related U.S. Application Data

(63) Continuation of application No. 16/537,155, filed on Aug. 9, 2019, now Pat. No. 11,249,482.

(51) Int. Cl.
| | | |
|---|---|---|
| *G05D 1/02* | (2020.01) | |
| *A47L 11/40* | (2006.01) | |
| *G05D 1/00* | (2006.01) | |

(52) U.S. Cl.
CPC ........ *G05D 1/0212* (2013.01); *A47L 11/4011* (2013.01); *A47L 11/4061* (2013.01);
(Continued)

(58) Field of Classification Search
CPC .............. G05D 1/0212; G05D 1/0088; G05D 2201/0203; G05D 2201/2015;
(Continued)

(56) References Cited

U.S. PATENT DOCUMENTS

| | | | |
|---|---|---|---|
| 8,387,193 B2 * | 3/2013 | Ziegler | ................. A47L 9/2852 |
| | | | 15/340.1 |
| 9,233,472 B2 | 1/2016 | Angle et al. | |

(Continued)

FOREIGN PATENT DOCUMENTS

| | | |
|---|---|---|
| CN | 107328419 | 11/2017 |
| EP | 3508937 | 7/2019 |

(Continued)

OTHER PUBLICATIONS

U.S. Appl. No. 16/216,386, filed Dec. 11, 2018, Chow et al.
(Continued)

*Primary Examiner* — Yazan A Soofi
(74) *Attorney, Agent, or Firm* — Fish & Richardson P.C.

(57) ABSTRACT

A method includes constructing a map of an environment based on mapping data produced by an autonomous cleaning robot in the environment during a first cleaning mission. Constructing the map includes providing a label associated with a portion of the mapping data. The method includes causing a remote computing device to present a visual representation of the environment based on the map, and a visual indicator of the label. The method includes causing the autonomous cleaning robot to initiate a behavior associated with the label during a second cleaning mission.

22 Claims, 16 Drawing Sheets

(52) U.S. Cl.
CPC ........ *G05D 1/0088* (2013.01); *A47L 2201/04* (2013.01); *A47L 2201/06* (2013.01); *G05D 2201/0203* (2013.01); *G05D 2201/0215* (2013.01)

(58) Field of Classification Search
CPC .............. A47L 11/4011; A47L 11/4061; A47L 2201/04; A47L 2201/06
USPC .......................................................... 701/23
See application file for complete search history.

(56) References Cited

U.S. PATENT DOCUMENTS

| | | | |
|---|---|---|---|
| 9,375,847 | B2 | 6/2016 | Angle et al. |
| 9,380,922 | B2 | 7/2016 | Duffley et al. |
| 9,802,322 | B2 | 10/2017 | Angle et al. |
| 9,874,873 | B2 | 1/2018 | Angle et al. |
| 10,100,968 | B1 | 10/2018 | Chow et al. |
| 11,249,482 | B2 | 2/2022 | Munich et al. |
| 2007/0061043 | A1* | 3/2007 | Ermakov ............... G05D 1/024 700/263 |
| 2014/0207282 | A1 | 7/2014 | Angle et al. |
| 2016/0282862 | A1 | 9/2016 | Duffley et al. |
| 2017/0203446 | A1 | 7/2017 | Dooley et al. |
| 2017/0225336 | A1 | 8/2017 | Deyle et al. |
| 2018/0030447 | A1 | 2/2018 | Jackson |
| 2018/0071918 | A1 | 3/2018 | Angle et al. |
| 2018/0284792 | A1 | 10/2018 | Kleiner et al. |
| 2018/0304472 | A1 | 10/2018 | Angle et al. |
| 2018/0364045 | A1 | 12/2018 | Williams et al. |
| 2019/0003842 | A1 | 1/2019 | Kassner |
| 2019/0032842 | A1 | 1/2019 | Chow et al. |
| 2019/0097827 | A1 | 3/2019 | Angle et al. |
| 2019/0204851 | A1 | 7/2019 | Afrouzi et al. |
| 2019/0212752 | A1* | 7/2019 | Fong ....................... G06V 20/36 |
| 2020/0077860 | A1* | 3/2020 | Lamon ................ A47L 11/4011 |
| 2020/0225673 | A1 | 7/2020 | Ebrahimi Afrouzi et al. |
| 2021/0089040 | A1* | 3/2021 | Ebrahimi Afrouzi ........................ G05D 1/0248 |
| 2021/0124354 | A1* | 4/2021 | Munich ................ G05D 1/0088 |

FOREIGN PATENT DOCUMENTS

| | | |
|---|---|---|
| JP | H06-030807 | 4/1994 |
| JP | 2007-048081 | 2/2007 |
| JP | 2018-139720 | 9/2018 |
| JP | 2019-121365 | 7/2019 |
| WO | WO 2018/193653 | 10/2018 |
| WO | WO 2018/208879 | 11/2018 |
| WO | WO 2019/097012 | 5/2019 |

OTHER PUBLICATIONS

U.S. Appl. No. 16/425,658, filed May 29, 2019, Munich et al.
International Preliminary Report on Patentability in International Appln. No. PCT/US2020/026174, dated Feb. 17, 2022, 9 pages.
PCT International Search Report and Written Opinion in International Appln. No. PCT/2020/026174, dated Jul. 16, 2020, 10 pages.
Extended European Search Report in European Appln. No. 20852701, dated May 17, 2023, 10 pages.

* cited by examiner

MAPPING FOR AUTONOMOUS MOBILE ROBOTS

CROSS-REFERENCE TO RELATED APPLICATIONS

This application is a continuation application of, and claims priority to, U.S. patent application Ser. No. 16/537,155, now U.S. Pat. No. 11,249,482, titled "Mapping for Autonomous Mobile Robots," filed on Aug. 9, 2019. The disclosure of the foregoing application is incorporated herein by reference in its entirety for all purposes.

TECHNICAL FIELD

This specification relates to mapping and, in particular, mapping for autonomous mobile robots.

BACKGROUND

Autonomous mobile robots include autonomous cleaning robots that autonomously perform cleaning tasks within an environment, e.g., a home. Many kinds of cleaning robots are autonomous to some degree and in different ways. A cleaning robot can include a controller configured to autonomously navigate the robot about an environment such that the robot can ingest debris as it moves.

SUMMARY

As an autonomous mobile cleaning robot moves about an environment, the robot can collect data that can be used to construct an intelligent robot-facing map of the environment. Based on the data collected by the robot, features in the environment, such as doors, dirty area, or other features, can be indicated on the map with labels, and states of the features can further be indicated on the map. The robot can select behaviors based on these labels and states of the features associated with these labels. For example, the feature can be a door that is indicated on the map with a label, and a state of the door can be open or closed. If the door is in a closed state, the robot can select a navigational behavior in which the robot does not attempt to cross the door's threshold, and if the door is in an open state, the robot can select a navigation behavior in which the robot attempts to cross the door's threshold. The intelligent robot-facing map can also be visually represented in a user-readable form in which both the labels and the states of the features are visually presented to the user, thus allowing the user to view a representation of the robot-facing map and to easily provide commands that are directly related to the labels on the robot-facing map.

Advantages of the foregoing may include, but are not limited to, those described below and herein elsewhere.

Implementations described herein can improve the reliability of autonomous mobile robots in traversing environments without encountering error conditions and with improved task performance. Rather than relying only on immediate responses by an autonomous mobile robot to the detection of features by its sensor system, the robot can rely on data collected from previous missions to intelligently plan a path around an environment to avoid error conditions. In subsequent cleaning missions after a first cleaning mission in which the robot discovers a feature, the robot can plan around the feature to avoid the risk of triggering an error condition associated with the feature. In addition, the robot can rely on data collected from previous missions to intelligently plan performance of its mission such that the robot can focus on areas in the environment that require more attention.

Implementations described herein can improve fleet management for autonomous mobile robots that may traverse similar or overlapping areas. Mapping data shared between autonomous mobile robots in a fleet can improve map construction efficiency, facilitate smart behavior selection within an environment for the robots in the fleet, and allow the robots to more quickly learn about notable features in the environment, e.g., features that require further attention by the robots, features that may trigger error conditions for the robots, or features that may have changing states that would affect behaviors of the robots. For example, a fleet of autonomous mobile robots in a home may include multiple types of autonomous mobile robots for completing various tasks in the home. A first robot may include a suite of sensors that is more sophisticated than the sensors on a second robot in the fleet. The first robot with the sophisticated suite of sensors can generate mapping data that the second robot would not be capable of generating, and the first robot could then provide the mapping data to the second robot, e.g., by providing the mapping data to a remote computing device accessible by the second robot. Even though the second robot may not have sensors capable of generating certain mapping data, the second robot could still use the mapping data to improve its performance in completing a task in the home. In addition, the second robot may include certain sensors that can collect mapping data usable by the first robot, thereby allowing the fleet of autonomous mobile robots to produce mapping data more quickly to construct a map of the home.

Implementations described herein can allow autonomous mobile robots to integrate with other smart devices in an environment. The environment can include several smart devices connectable to one another or to a network accessible by devices in the environment. These smart devices can include one or more autonomous mobile robots, and the smart devices together with an autonomous mobile robot can generate mapping data that can be usable by the robot to navigate the environment and perform a task in the environment. The smart devices in the environment can each produce data that is usable to construct a map. The robot can in turn use this map to improve performance of its task in the environment and to improve efficiency of the paths that it takes in the environment.

In addition, in being integrated with other smart devices, autonomous mobile robots can be configured to control the other smart devices such that the robots can traverse an environment without being blocked by certain smart devices. For example, an environment can include a smart door and an autonomous mobile robot. In response to detecting the smart door, the robot can operate the smart door to ensure that the smart door is in an open state, thereby allowing the robot to move easily from a first room in the environment to a second room in the environment separated from the first room by the door.

Implementations described herein can improve the efficiency of navigation of autonomous mobile robots within an environment. An autonomous mobile robot can plan a path through the environment based on a constructed map, and the planned path can allow the robot to traverse the environment and perform a task more efficiently than an autonomous mobile robot that traverses the environment and performs the task without the aid of the map. In further examples, an autonomous mobile robot can plan a path that allows the robot to efficiently move about obstacles in the environment. The obstacles, for example, can be arranged in a manner that would increase the likelihood that the robot makes inefficient maneuvers. With a map, the robot can plan a path around the obstacles that reduces the likelihood that the robot makes such inefficient maneuvers. In further examples, the map allows the robot to consider states of various features in the environment. The states of the features in the environment could affect the path that the robot could take to traverse the environment. In this regard, by knowing the states of features in the environment, the robot can plan paths that can avoid features when the features are in certain states. For example, if the feature is a door separating a first room from a second room, the robot can plan a path through the first room when the door is in a closed state, and can plan a path through both the first room and the second room when the door is in an open state.

Implementations described herein can reduce the likelihood that autonomous mobile robots trigger error conditions. For example, an autonomous mobile robot can select a navigational behavior in a region of the room based on a feature along a portion of the floor surface in the region. The feature can be, for example, an elevated portion of the floor surface along which the robot may have heightened risk of getting stuck as the robot traverses the elevated portion. The robot can select a navigational behavior, e.g., an angle or a speed at which the robot approaches the elevated portion, that would reduce the likelihood that the robot gets stuck on the elevated portion.

Implementations described herein can further improve cleaning efficacy of autonomous cleaning robots that are used to clean a floor surface of an environment. Labels on a map can correspond to, for example, dirty areas in the environment. An autonomous cleaning robot can select a behavior for each dirty area that depends on a state of each dirty area, e.g., a level of a dirtiness of each dirty area. For dirtier areas, the behavior can allow the robot to spend more time traversing the area, to traverse the area multiple times, or to traverse the area with a higher vacuum power. By selectively initiating behaviors depending on a dirtiness of an area, the robot can more effectively clean dirtier areas of the environment.

Implementations described herein can lead to a richer user experience in several ways. First, labels can provide for improved visualization of an autonomous mobile robot's map. These labels form a common frame of reference for the robot and the user to communicate. Compared to a map that does not have any labels, the maps described herein, when presented to the user, can be more easily understandable by the user. In addition, the maps allow the robot to be more easily used and controlled by the user.

In one aspect, a method includes constructing a map of an environment based on mapping data produced by an autonomous cleaning robot in the environment during a first cleaning mission. Constructing the map includes providing a label associated with a portion of the mapping data. The method includes causing a remote computing device to present a visual representation of the environment based on the map, and a visual indicator of the label. The method includes causing the autonomous cleaning robot to initiate a behavior associated with the label during a second cleaning mission.

In another aspect, an autonomous cleaning robot includes a drive system to support the autonomous cleaning robot above a floor surface in an environment. The drive system is configured to move the autonomous cleaning robot about the floor surface. The autonomous cleaning robot includes a cleaning assembly to clean the floor surface as the autonomous cleaning robot moves about the floor surface, a sensor system, and a controller operably connected to the drive system, the cleaning assembly, and the sensor system. The controller is configured to execute instructions to perform operations including producing mapping data of the environment using the sensor system during a first cleaning mission, and initiating a behavior during a second cleaning mission based on a label in a map constructed from the mapping data. The label is associated with a portion of the mapping data produced during the first cleaning mission.

In another aspect, a mobile computing device including a user input device, a display, and a controller operably connected to the user input device and the display. The controller is configured to execute instructions to perform operations including presenting, using the display, a visual representation of an environment based on mapping data produced by an autonomous cleaning robot in the environment during a first cleaning mission, a visual indicator of a label associated with a portion of the mapping data, and a visual indicator of a state of a feature in the environment associated with the label. The operations include updating the visual indicator of the label and the visual indicator of the state of the feature based on mapping data produced by the autonomous cleaning robot during a second cleaning mission.

In some implementations, the label is associated with a feature in the environment associated with the portion of the mapping data. The feature in the environment can have a number of states including a first state and a second state. Causing the autonomous cleaning robot to initiate the behavior associated with the label during the second cleaning mission includes causing the autonomous cleaning robot to initiate the behavior based on the feature being in the first state during the second cleaning mission. In some implementations, the feature is a first feature having a feature type, the label is a first label, and the portion of the mapping data is a first portion of the mapping data. Constructing the map can include providing a second label associated with a second portion of the mapping data. The second label can be associated with a second feature in the environment having the feature type and the number of states. The method further can include causing the remote computing device to present a visual indicator of the second label. In some implementations, the method further includes determining that the first feature and the second feature each have the feature type based on imagery of the first feature and imagery of the second feature. In some implementations, the imagery of the first feature and the imagery of the second feature are captured by the autonomous cleaning robot. In some implementations, the imagery of the first feature and the imagery of the second feature are captured by one or more image capture devices in the environment. In some implementations, the method further includes causing the autonomous cleaning robot to initiate the behavior based on the second feature being in the first state during the second cleaning mission. In some implementations, the behavior is a first behavior, and the method further includes causing the autonomous cleaning robot to initiate a second behavior based on the second feature being in the second state during the second cleaning mission.

In some implementations, causing the autonomous cleaning robot to initiate the behavior based on the feature being in the first state during the second cleaning mission includes causing the autonomous cleaning robot to initiate the behavior in response to the autonomous cleaning robot detecting that the feature is in the first state.

In some implementations, the feature is a region of a floor surface in the environment. The first state can be a first level of dirtiness of the region of the floor surface and the second state can be a second level of dirtiness of the region. In some implementations, the autonomous cleaning robot in a first behavior associated with the first state provides a first degree of cleaning in the region greater than a second degree of cleaning in the region in a second behavior associated with the second state. In some implementations, the region is a first region, the label is a first label, and the portion of the mapping data is a first portion of the mapping data. Constructing the map can include providing a second label associated with a second portion of the mapping data. The second label can be associated with a second region in the environment having the number of states. In some implementations, the label is a first label, and the region is a first region. The first region can be associated with a first object in the environment. The method can further include providing a second label associated with a second region in the environment based on a type of a second object in the environment being identical to a type of the first object in the environment. The second region can be associated with the second object.

In some implementations, the feature is a door in the environment between a first portion of the environment and a second portion of the environment, and the first state is an open state of the door, and the second state is a closed state of the door. In some implementations, the autonomous cleaning robot in a first behavior associated with the open state moves from the first portion of the environment to the second portion of the environment. The autonomous cleaning robot in a second behavior associated with the closed state can detect the door and can provide an instruction to move the door to the open state. In some implementations, the door is in the open state, and during the second cleaning mission, the door is in the closed state. In some implementations, the door is a first door, the label is a first label, and the portion of the mapping data is a first portion of the mapping data. Constructing the map can include providing a second label associated with a second portion of the mapping data. The second label can be associated with a second door in the environment having the number of states. In some implementations, the method further includes causing the remote computing device to issue a request for a user to operate the door in the closed state to be in the open state. In some implementations, the door is an electronically controllable door. Causing the autonomous cleaning robot to initiate the behavior based on the feature being in the first state during the second cleaning mission can include causing the autonomous cleaning robot to transmit data to cause the electronically controllable door to move from the closed state to the open state.

In some implementations, the method further includes causing the remote computing device to issue a request to change a state of the feature.

In some implementations, the label is associated with a region in the environment associated with a first navigational behavior of the autonomous cleaning robot during the first cleaning mission. The behavior can be a second navigational behavior selected based on the first navigational behavior. In some implementations, in the first navigational behavior, the autonomous cleaning robot does not traverse the region. The autonomous cleaning robot can initiate the second navigational behavior to traverse the region. In some implementations, the mapping data is first mapping data. The label can be associated with a portion of second mapping data collected during a third cleaning mission. The portion of the second mapping data can be associated with a third navigational behavior in which the autonomous cleaning robot traverses the region. A parameter of the second navigational behavior can be selected to match a parameter of the third navigational behavior. In some implementations, the parameter is a speed of the autonomous cleaning robot or an approach angle of the autonomous cleaning robot relative to the region. In some implementations, in the first navigational behavior, the autonomous cleaning robot moves along a first path through the region, the first path having a first quantity of entry points into the region. The autonomous cleaning robot can initiate the second navigational behavior to move along a second path through the region. The second path can have a second quantity of entry points into the region less than the first quantity of entry points. In some implementations, the mapping data is first mapping data, and the method includes deleting the label in response to second mapping data produced by the autonomous cleaning robot indicating removal of one or more obstacles from the region.

In some implementations, the map is accessible by multiple electronic devices in the environment. The multiple electronic devices can include the autonomous cleaning robot. In some implementations, the autonomous cleaning robot is a first autonomous cleaning robot, and the multiple electronic devices in the environment includes a second autonomous cleaning robot.

In some implementations, the portion of the mapping data is associated with an obstacle in the environment. The method can further include causing an autonomous mobile robot, based on the label, to avoid and detect the obstacle without contacting the obstacle.

In some implementations, the label is associated with a feature in the environment associated with the portion of the mapping data. The feature in the environment can have a number of states including a first state and a second state. The portion of the mapping data can be associated with the first state of the feature. The method can further include causing the remote computing device to present a visual indicator that the feature is in the first state. In some implementations, the method further includes, in response to determining that the feature is in the second state, transmitting data to cause the remote computing device to present a visual indicator that the feature is in the second state.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Autonomous mobile robots can be controlled to move about a floor surface in an environment. As these robots move about the floor surface, the robots can produce mapping data, e.g., using sensors on the robots, and the mapping data can then be used to construct a labeled map. Labels on the map can correspond to features in the environment. The robot can initiate behaviors dependent on the labels, and dependent on states of the features in the environment. Furthermore, a user can monitor the environment and the robot using a visual representation of the labeled map.

Figure 1A:
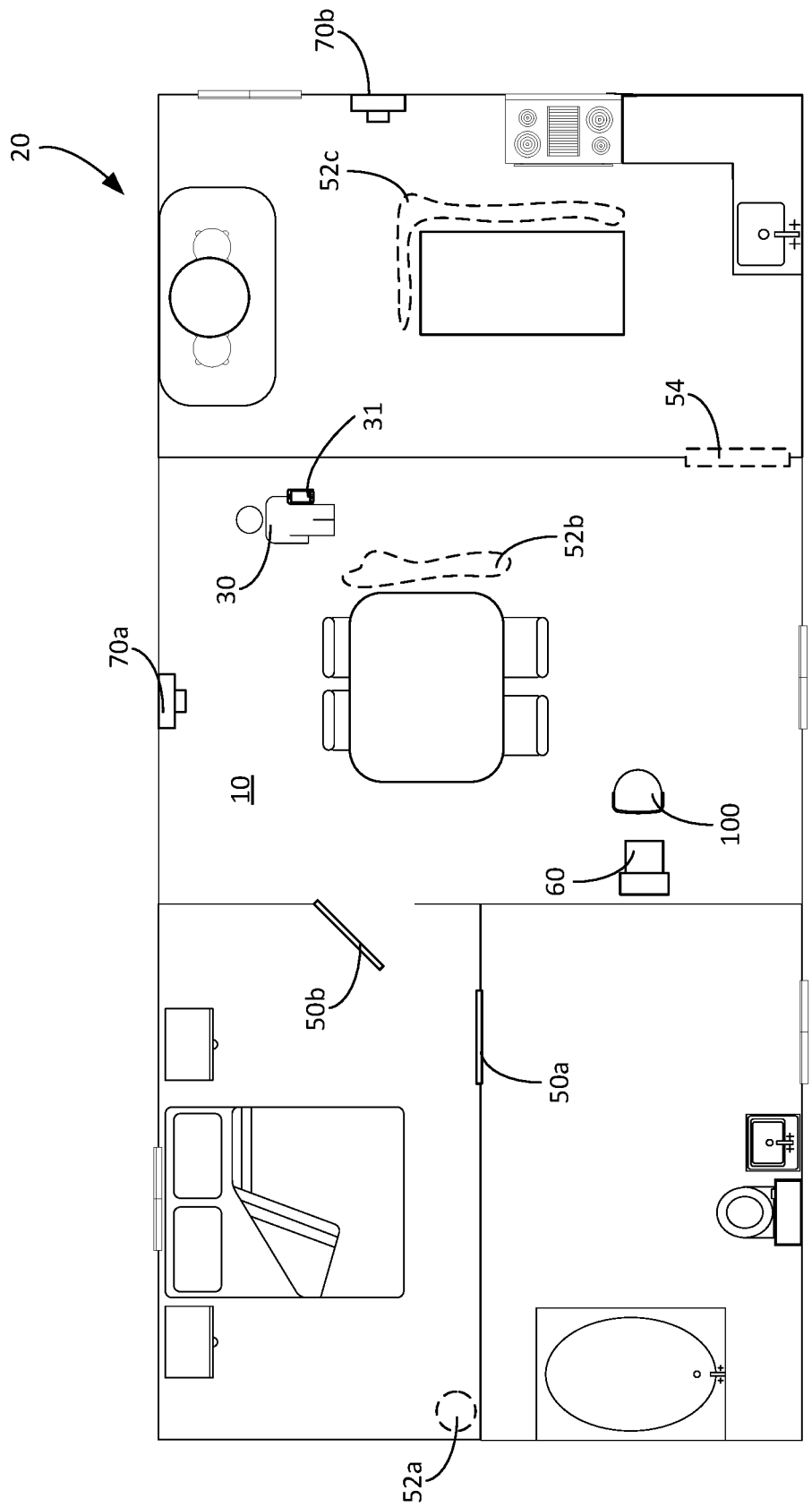
FIG. 1A is a schematic top view of an environment with an autonomous cleaning robot.
Figure 1B:
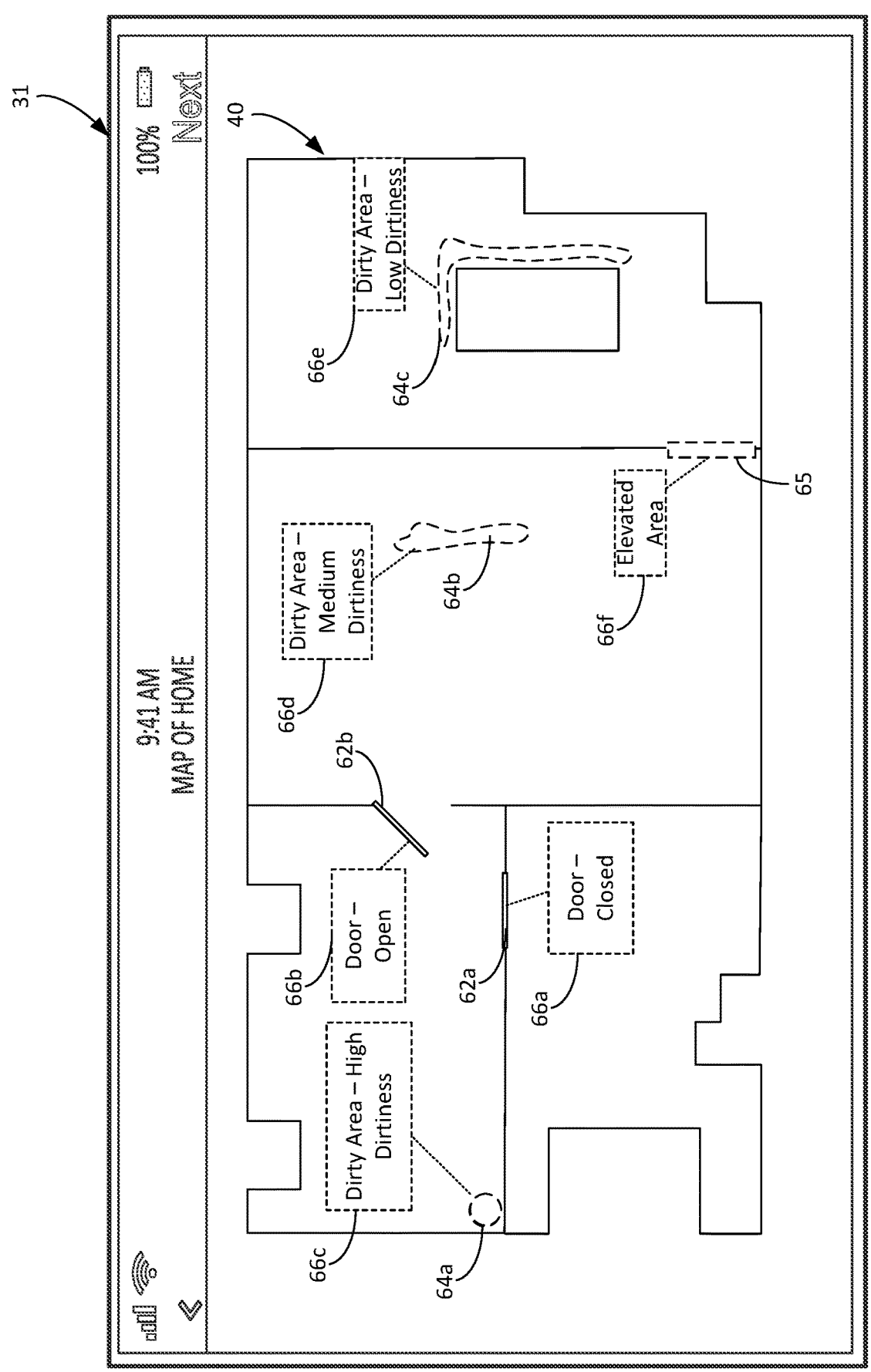
FIG. 1B is a front view of a user device showing a visual representation of a map.

FIG. 1A depicts an example of an autonomous cleaning robot 100 on a floor surface 10 in an environment 20, e.g., a home. A user 30 can operate a user computing device 31 to view a visual representation 40 (shown in FIG. 1B) of a map of the environment 20. As the robot 100 moves about the floor surface 10, the robot 100 generates mapping data that can be used to produce the map of the environment 20. The robot 100 can be controlled, e.g., autonomously by a controller of the robot 100, manually by the user 30 operating the user computing device 31, or otherwise, to initiate behaviors responsive to features in the environment 20. For example, the features in the environment 20 include doors 50a, 50b, dirty areas 52a, 52b, 52c, and an elevated portion 54 (e.g., a threshold between rooms in the environment 20). The robot 100 can include one or more sensors capable of detecting these features. As described herein, one or more of these features may be labeled in the map constructed from the mapping data collected by the robot 100. The labels for these features may be used by the robot 100 to initiate certain behaviors associated with the labels, and may also be visually represented on a visual representation of the map that is presented to the user 30. As shown in FIG. 1B, the visual representation 40 of the map includes indicators 62a, 62b for the doors 50a, 50b, indicators 64a, 64b, 64c for the dirty areas 52a, 52b, 52c, and an indicator 65 for the elevated portion 54. In addition, the visual representation 40 further includes indicators 66a-66f of states, types, and/or locations of the features in the environment 20. For example, the indicators 66a-66e indicate the current states of the doors 50a, 50b, and the dirty areas 52a, 52b, 52c, respectively, and the indicators 66a-66f indicate the feature types of the doors 50a, 50b, the dirty areas 52a, 52b, 52c, and the elevated portion 54, respectively. For example, the types of the doors 50a, 50b are indicated as "door," and the states of the doors 50a, 50b are indicated as "closed" and "open," respectively. The types of the dirty areas 52a, 52b, 52c are indicated as "dirty area," and the states of the dirty areas 52a, 52b, 52c are indicated "high dirtiness," "medium dirtiness," and "low dirtiness," respectively.

Example Autonomous Mobile Robots

Figure 2:
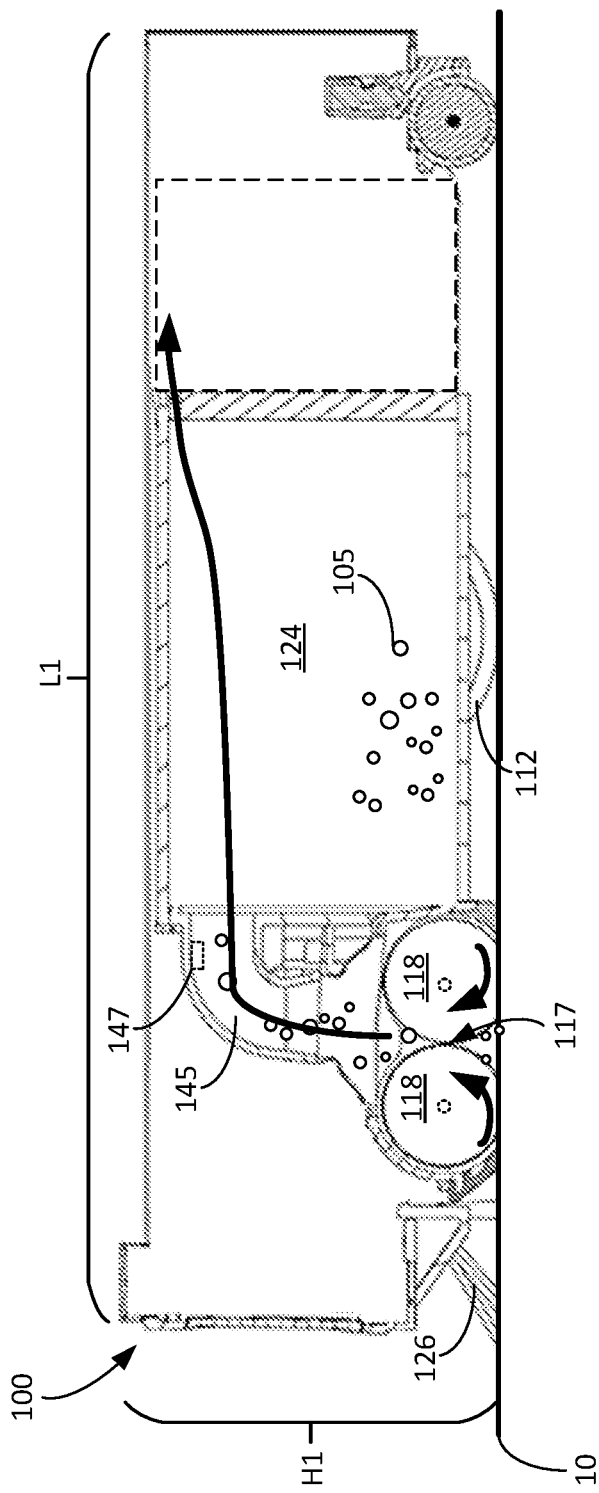
FIGS. 2, 3A, and 3B are cross-sectional side, bottom, and top perspective views, respectively, of an autonomous cleaning robot.
Figure 3A:
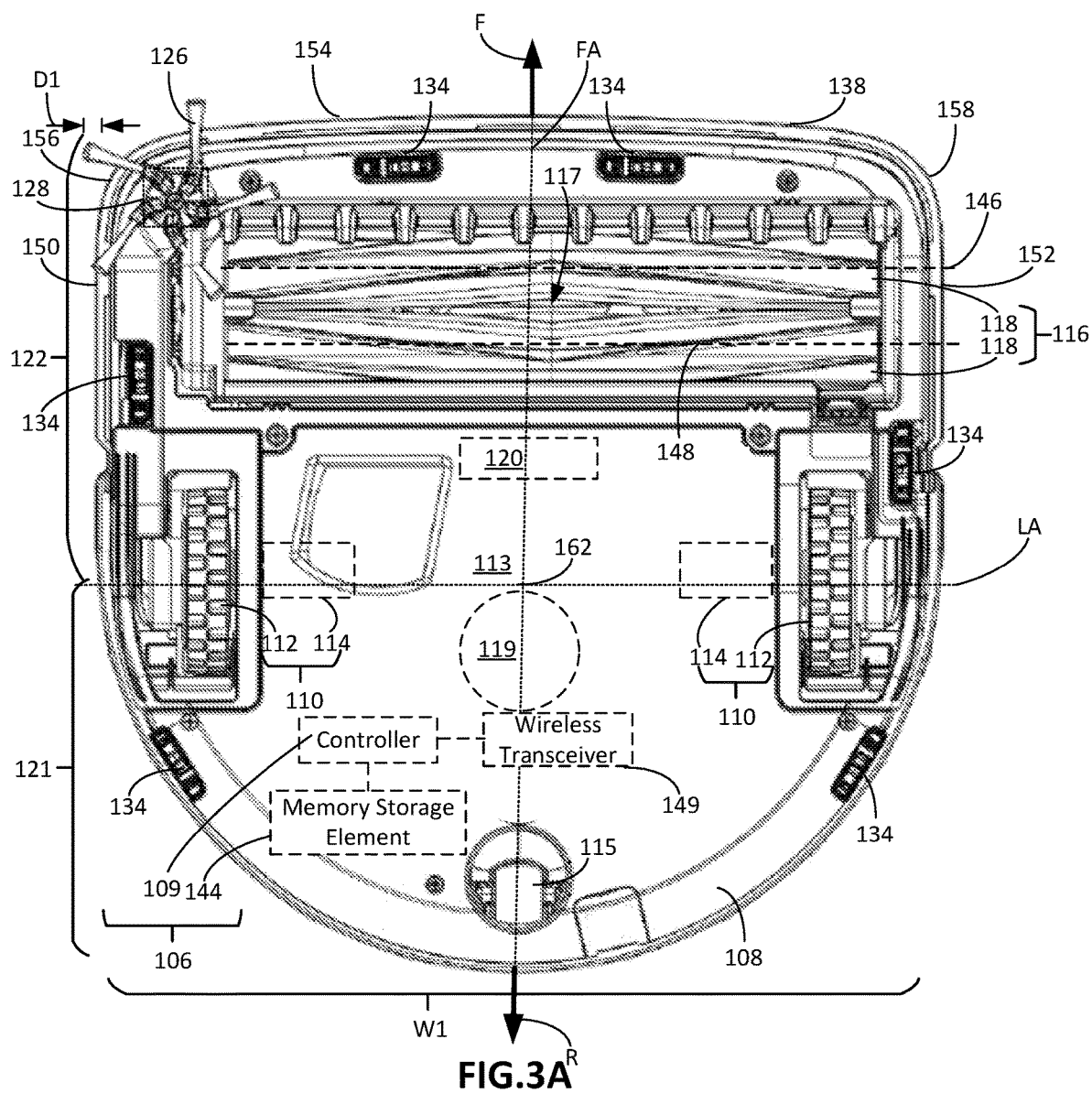
Figure 3B:
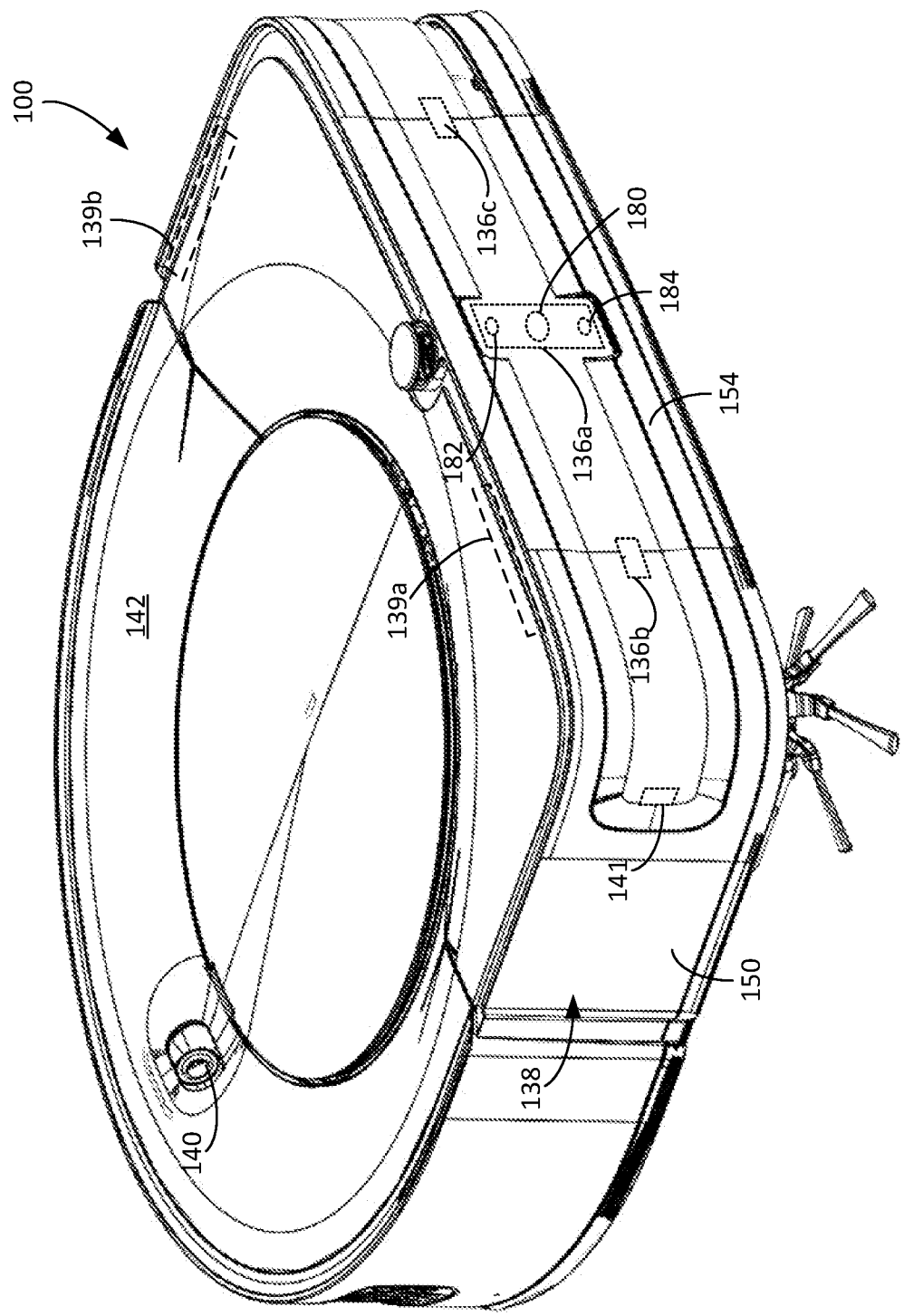

FIGS. 2 and 3A-3B depict an example of the robot 100. Referring to FIG. 2, the robot 100 collects debris 105 from the floor surface 10 as the robot 100 traverses the floor surface 10. The robot 100 is usable to perform one or more cleaning missions in the environment 20 (shown in FIG. 1A) to clean the floor surface 10. A user can provide a command to the robot 100 to initiate a cleaning mission. For example, the user can provide a start command that causes the robot 100 to initiate the cleaning mission upon receiving the start command. In another example, the user can provide a schedule that causes the robot 100 to initiate a cleaning mission at a scheduled time indicated in the schedule. The schedule can include multiple scheduled times at which the robot 100 initiates cleaning missions. In some implementations, between a start and an end of a single cleaning mission, the robot 100 may cease the cleaning mission to charge the robot 100, e.g., to charge an energy storage unit of the robot 100. The robot 100 can then resume the cleaning mission after the robot 100 is sufficiently charged. The robot 100 can charge itself at a docking station 60 (shown in FIG. 1A). In some implementations, the docking station 60 can, in addition to charging the robot 100, evacuate debris from the robot 100 when the robot 100 is docked at the docking station 60.

Referring to FIG. 3A, the robot 100 includes a housing infrastructure 108. The housing infrastructure 108 can define the structural periphery of the robot 100. In some examples, the housing infrastructure 108 includes a chassis, cover, bottom plate, and bumper assembly. The robot 100 is a household robot that has a small profile so that the robot 100 can fit under furniture within a home. For example, a height H1 (shown in FIG. 2) of the robot 100 relative to the floor surface can be no more than 13 centimeters. The robot 100 is also compact. An overall length L1 (shown in FIG. 2) of the robot 100 and an overall width W1 (shown in FIG. 3A) are each between 30 and 60 centimeters, e.g., between 30 and 40 centimeters, 40 and 50 centimeters, or 50 and 60 centimeters. The overall width W1 can correspond to a width of the housing infrastructure 108 of the robot 100.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller 109, within the robot 100.

The drive system 110 is operable to propel the robot 100 across the floor surface 10. The robot 100 can be propelled in a forward drive direction F or a rearward drive direction R. The robot 100 can also be propelled such that the robot 100 turns in place or turns while moving in the forward drive direction F or the rearward drive direction R. In the example depicted in FIG. 3A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Referring to FIG. 3B, the robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portion 122 connect the side surface 150, 152 to the forward surface 154.

In the example depicted in FIGS. 2, 3A, and 3B, the robot 100 is an autonomous mobile floor cleaning robot that includes a cleaning assembly 116 (shown in FIG. 3A)

operable to clean the floor surface 10. For example, the robot 100 is a vacuum cleaning robot in which the cleaning assembly 116 is operable to clean the floor surface 10 by ingesting debris 105 (shown in FIG. 2) from the floor surface 10. The cleaning assembly 116 includes a cleaning inlet 117 through which debris is collected by the robot 100. The cleaning inlet 117 is positioned forward of a center of the robot 100, e.g., a center 162, and along the forward portion 122 of the robot 100 between the side surfaces 150, 152 of the forward portion 122.

The cleaning assembly 116 includes one or more rotatable members, e.g., rotatable members 118 driven by a motor 120. The rotatable members 118 extend horizontally across the forward portion 122 of the robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the robot 100. Referring also to FIG. 2, the cleaning inlet 117 is positioned between the rotatable members 118.

As shown in FIG. 2, the rotatable members 118 are rollers that counter-rotate relative to one another. For example, the rotatable members 118 can be rotatable about parallel horizontal axes 146, 148 (shown in FIG. 3A) to agitate debris 105 on the floor surface 10 and direct the debris 105 toward the cleaning inlet 117, into the cleaning inlet 117, and into a suction pathway 145 (shown in FIG. 2) in the robot 100. Referring back to FIG. 3A, the rotatable members 118 can be positioned entirely within the forward portion 122 of the robot 100. The rotatable members 118 include elastomeric shells that contact debris 105 on the floor surface 10 to direct debris 105 through the cleaning inlet 117 between the rotatable members 118 and into an interior of the robot 100, e.g., into a debris bin 124 (shown in FIG. 2), as the rotatable members 118 rotate relative to the housing infrastructure 108. The rotatable members 118 further contact the floor surface 10 to agitate debris 105 on the floor surface 10.

The robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The robot 100 further includes a brush 126 that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The robot 100 includes a motor 128 operably connected to the brush 126 to rotate the brush 126.

The brush 126 is a side brush laterally offset from a fore-aft axis FA of the robot 100 such that the brush 126 extends beyond an outer perimeter of the housing infrastructure 108 of the robot 100. For example, the brush 126 can extend beyond one of the side surfaces 150, 152 of the robot 100 and can thereby be capable of engaging debris on portions of the floor surface 10 that the rotatable members 118 typically cannot reach, e.g., portions of the floor surface 10 outside of a portion of the floor surface 10 directly underneath the robot 100. The brush 126 is also forwardly offset from a lateral axis LA of the robot 100 such that the brush 126 also extends beyond the forward surface 154 of the housing infrastructure 108. As depicted in FIG. 3A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning assembly 116 as the robot 100 moves. For example, in examples in which the robot 100 is moving in the forward drive direction F, the brush 126 is rotatable in a clockwise direction (when viewed from a perspective above the robot 100) such that debris that the brush 126 contacts moves toward the cleaning assembly and toward a portion of the floor surface 10 in front of the cleaning assembly 116 in the forward drive direction F. As a result, as the robot 100 moves in the forward drive direction F, the cleaning inlet 117 of the robot 100 can collect the debris swept by the brush 126. In examples in which the robot 100 is moving in the rearward drive direction R, the brush 126 is rotatable in a counterclockwise direction (when viewed from a perspective above the robot 100) such that debris that the brush 126 contacts moves toward a portion of the floor surface 10 behind the cleaning assembly 116 in the rearward drive direction R. As a result, as the robot 100 moves in the rearward drive direction R, the cleaning inlet 117 of the robot 100 can collect the debris swept by the brush 126.

The electrical circuitry 106 includes, in addition to the controller 109, a memory storage element 144 and a sensor system with one or more electrical sensors, for example. The sensor system, as described herein, can generate a signal indicative of a current location of the robot 100, and can generate signals indicative of locations of the robot 100 as the robot 100 travels along the floor surface 10. The controller 109 is configured to execute instructions to perform one or more operations as described herein. The memory storage element 144 is accessible by the controller 109 and disposed within the housing infrastructure 108. The one or more electrical sensors are configured to detect features in an environment 20 of the robot 100. For example, referring to FIG. 3A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the robot 100 where the cliff sensors 134 are disposed and redirect the robot accordingly.

Referring to FIG. 3B, the sensor system includes one or more proximity sensors that can detect objects along the floor surface 10 that are near the robot 100. For example, the sensor system can include proximity sensors 136a, 136b, 136c disposed proximate the forward surface 154 of the housing infrastructure 108. Each of the proximity sensors 136a, 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment 20 of the robot 100.

The sensor system includes a bumper system including the bumper 138 and one or more bump sensors that detect contact between the bumper 138 and obstacles in the environment 20. The bumper 138 forms part of the housing infrastructure 108. For example, the bumper 138 can form the side surfaces 150, 152 as well as the forward surface 154. The sensor system, for example, can include the bump sensors 139a, 139b. The bump sensors 139a, 139b can include break beam sensors, capacitive sensors, or other sensors that can detect contact between the robot 100, e.g., the bumper 138, and objects in the environment 20. In some implementations, the bump sensor 139a can be used to detect movement of the bumper 138 along the fore-aft axis FA (shown in FIG. 3A) of the robot 100, and the bump sensor 139b can be used to detect movement of the bumper 138 along the lateral axis LA (shown in FIG. 3A) of the robot 100. The proximity sensors 136a, 136b, 136c can detect objects before the robot 100 contacts the objects, and the bump sensors 139a, 139b can detect objects that contact the bumper 138, e.g., in response to the robot 100 contacting the objects.

The sensor system includes one or more obstacle following sensors. For example, the robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the robot 100 and perpendicular to the side surface 150 of the robot 100. For example, the detectable objects include obstacles such as furniture, walls, persons, and other objects in the environment 20 of the robot 100. In some implementations, the sensor system can include an obstacle following sensor along the side surface 152, and the obstacle following sensor can detect the presence or the absence of an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In this regard, the left obstacle following can be used to determine a distance between an object, e.g., an obstacle surface, to the left of the robot 100 and the robot 100, and the right obstacle following sensor can be used to determine a distance between an object, e.g., an obstacle surface, to the right of the robot 100 and the robot 100.

In some implementations, at least some of the proximity sensors 136a, 136b, 136c, and the obstacle following sensor 141 each include an optical emitter and an optical detector. The optical emitter emits an optical beam outward from the robot 100, e.g., outward in a horizontal direction, and the optical detector detects a reflection of the optical beam that reflects off an object near the robot 100. The robot 100, e.g., using the controller 109, can determine a time of flight of the optical beam and thereby determine a distance between the optical detector and the object, and hence a distance between the robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the robot 100. In some implementations, the optical emitters 182, 184 each emit a fan of beams outward toward an obstacle surface such that a one-dimensional grid of dots appears on one or more obstacle surfaces. The one-dimensional grid of dots can be positioned on a horizontally extending line. In some implementations, the grid of dots can extend across multiple obstacle surfaces, e.g., multiple obstacles surfaces adjacent to one another. The optical detector 180 can capture an image representative of the grid of dots formed by the optical emitter 182 and the grid of dots formed by the optical emitter 184. Based on a size of a dot in the image, the robot 100 can determine a distance of an object on which the dot appears relative to the optical detector 180, e.g., relative to the robot 100. The robot 100 can make this determination for each of the dots, thus allowing the robot 100 to determine a shape of an object on which the dots appear. In addition, if multiple objects are ahead of the robot 100, the robot 100 can determine a shape of each of the objects. In some implementations, the objects can include one or more objects that are laterally offset from a portion of the floor surface 10 directly in front of the robot 100.

The sensor system further includes an image capture device 140, e.g., a camera, directed toward a top portion 142 of the housing infrastructure 108. The image capture device 140 generates digital imagery of the environment 20 of the robot 100 as the robot 100 moves about the floor surface 10. The image capture device 140 is angled in an upward direction, e.g., angled between 30 degrees and 80 degrees from the floor surface 10 about which the robot 100 navigates. The camera, when angled upward, is able to capture images of wall surfaces of the environment 20 so that features corresponding to objects on the wall surfaces can be used for localization.

When the controller 109 causes the robot 100 to perform the mission, the controller 109 operates the motors 114 to drive the drive wheels 112 and propel the robot 100 along the floor surface 10. In addition, the controller 109 operates the motor 120 to cause the rotatable members 118 to rotate, operates the motor 128 to cause the brush 126 to rotate, and operates the motor of the vacuum system 119 to generate the airflow. To cause the robot 100 to perform various navigational and cleaning behaviors, the controller 109 executes software stored on the memory storage element 144 to cause the robot 100 to perform by operating the various motors of the robot 100. The controller 109 operates the various motors of the robot 100 to cause the robot 100 to perform the behaviors.

The sensor system can further include sensors for tracking a distance traveled by the robot 100. For example, the sensor system can include encoders associated with the motors 114 for the drive wheels 112, and these encoders can track a distance that the robot 100 has traveled. In some implementations, the sensor system includes an optical sensor facing downward toward a floor surface. The optical sensor can be an optical mouse sensor. For example, the optical sensor can be positioned to direct light through a bottom surface of the robot 100 toward the floor surface 10. The optical sensor can detect reflections of the light and can detect a distance traveled by the robot 100 based on changes in floor features as the robot 100 travels along the floor surface 10.

The controller 109 uses data collected by the sensors of the sensor system to control navigational behaviors of the robot 100 during the mission. For example, the controller 109 uses the sensor data collected by obstacle detection sensors of the robot 100, e.g., the cliff sensors 134, the proximity sensors 136a, 136b, 136c, and the bump sensors 139a, 139b, to enable the robot 100 to avoid obstacles within the environment 20 of the robot 100 during the mission.

The sensor data can be used by the controller 109 for simultaneous localization and mapping (SLAM) techniques in which the controller 109 extracts features of the environment 20 represented by the sensor data and constructs a map of the floor surface 10 of the environment 20. The sensor data collected by the image capture device 140 can be used for techniques such as vision-based SLAM (VSLAM) in which the controller 109 extracts visual features corresponding to objects in the environment 20 and constructs the map using these visual features. As the controller 109 directs the robot 100 about the floor surface 10 during the mission, the controller 109 uses SLAM techniques to determine a location of the robot 100 within the map by detecting features represented in collected sensor data and comparing the features to previously-stored features. The map formed from the sensor data can indicate locations of traversable and nontraversable space within the environment 20. For example, locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the robot 100 to perform its behaviors, the memory storage element 144 stores sensor data or data resulting from processing of the sensor data for access by the controller 109 from one mission to another mission. For example, the map is a persistent map that is usable and updateable by the controller 109 of the robot 100 from one mission to another mission to navigate the robot 100 about the floor surface 10.

The persistent data, including the persistent map, enable the robot 100 to efficiently clean the floor surface 10. For example, the persistent map enables the controller 109 to direct the robot 100 toward open floor space and to avoid nontraversable space. In addition, for subsequent missions, the controller 109 is able to plan navigation of the robot 100 through the environment 20 using the persistent map to optimize paths taken during the missions.

The sensor system can further include a debris detection sensor 147 that can detect debris on the floor surface 10 of the environment 20. The debris detection sensor 147 can be used to detect portions of the floor surface 10 in the environment 20 that are dirtier than other portions of the floor surface 10 in the environment 20. In some implementations, the debris detection sensor 147 (shown in FIG. 2) is capable of detecting an amount of debris, or a rate of debris, passing through the suction pathway 145. The debris detection sensor 147 can be an optical sensor configured to detect debris as it passes through the suction pathway 145. Alternatively, the debris detection sensor 147 can be a piezoelectric sensor that detects debris as the debris impacts a wall of the suction pathway 145. In some implementations, the debris detection sensor 147 detects debris before the debris is ingested by the robot 100 into the suction pathway 145. The debris detection sensor 147 can be, for example, an image capture device that captures images of a portion of the floor surface 10 ahead of the robot 100. The controller 109 can then use these images to detect the presence of debris on this portion of the floor surface 10.

The robot 100 can further include a wireless transceiver 149 (shown in FIG. 3A). The wireless transceiver 149 allows the robot 100 to wirelessly communicate data with a communication network (e.g., the communication network 185 described herein with respect to FIG. 4). The robot 100 can receive or transmit data using the wireless transceiver 149, and can, for example, receive data representative of a map and transmit data representative of mapping data collected by the robot 100.

Example Communication Networks

Figure 4:
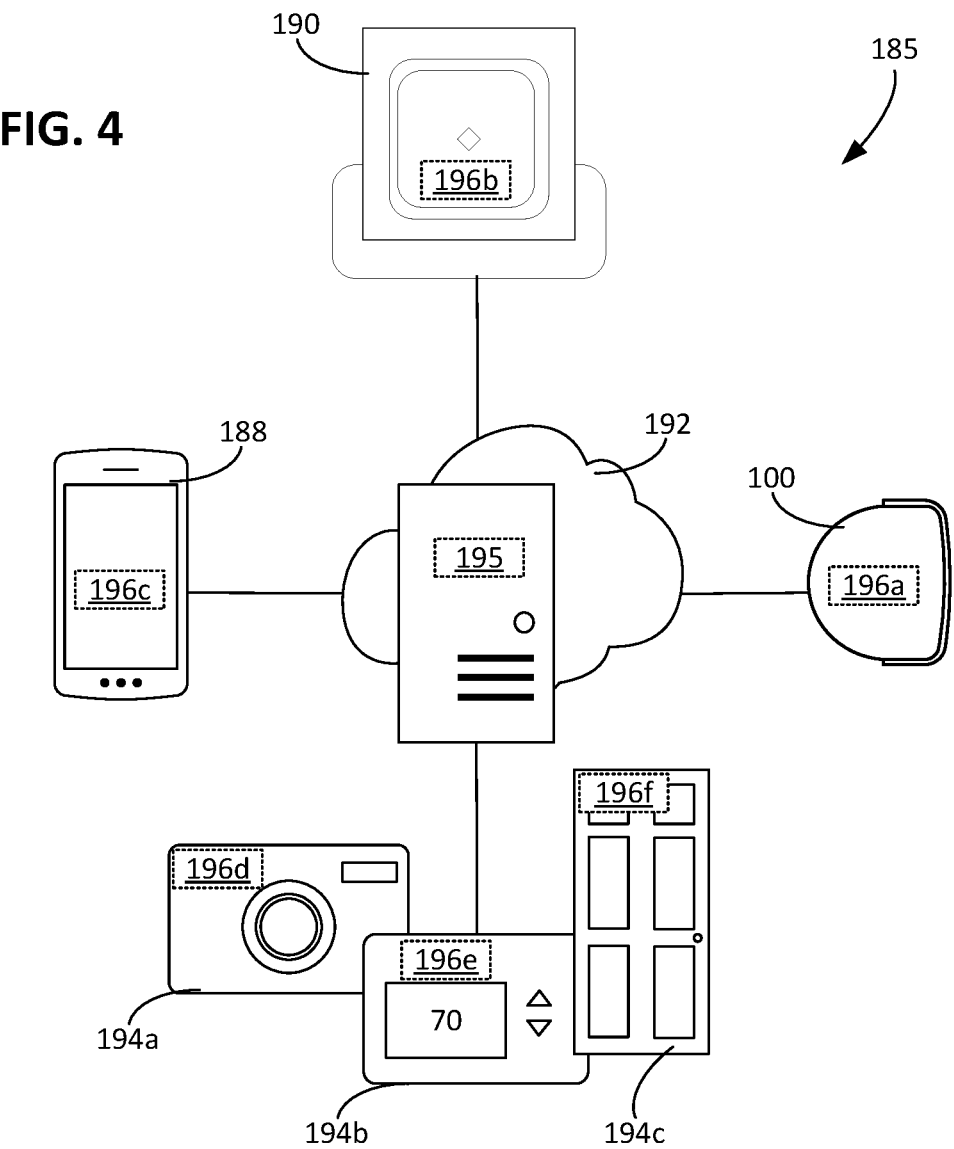
FIG. 4 is a diagram of a communication network.

Referring to FIG. 4, an example communication network 185 is shown. Nodes of the communication network 185 include the robot 100, a mobile device 188, an autonomous mobile robot 190, a cloud computing system 192, and smart devices 194a, 194b, 194c. The robot 100, the mobile device 188, the robot 190, and the smart devices 194a, 194b, 194c are networked devices, i.e., devices connected to the communication network 185. Using the communication network 185, the robot 100, the mobile device 188, the robot 190, the cloud computing system 192, and the smart devices 194a, 194b, 194c can communicate with one another to transmit data to one another and receive data from one another.

In some implementations, the robot 100, the robot 190, or both the robot 100 and the robot 190 communicate with the mobile device 188 through the cloud computing system 192. Alternatively or additionally, the robot 100, the robot 190, or both the robot 100 and the robot 190 communicate directly with the mobile device 188. Various types and combinations of wireless networks (e.g., Bluetooth, radiofrequency, optical-based, etc.) and network architectures (e.g., mesh networks) may be employed by the communication network 185.

In some implementations, the user computing device 31 (shown in FIG. 1A) is a type of the mobile device 188. The mobile device 188 as shown in FIG. 4 can be a remote device that can be linked to the cloud computing system 192 and can enable the user 30 to provide inputs on the mobile device 188. The mobile device 188 can include user input elements such as, for example, one or more of a touchscreen display, buttons, a microphone, a mouse, a keyboard, or other devices that respond to inputs provided by the user 30. The mobile device 188 alternatively or additionally includes immersive media (e.g., virtual reality) with which the user 30 interacts to provide a user input. The mobile device 188, in these cases, is, for example, a virtual reality headset or a head-mounted display. The user can provide inputs corresponding to commands for the mobile device 188. In such cases, the mobile device 188 transmits a signal to the cloud computing system 192 to cause the cloud computing system 192 to transmit a command signal to the robot 100. In some implementations, the mobile device 188 can present augmented reality images. In some implementations, the mobile device 188 is a smartphone, a laptop computer, a tablet computing device, or another mobile device.

In some implementations, the communication network 185 can include additional nodes. For example, nodes of the communication network 185 can include additional robots. Alternatively or additionally, nodes of the communication network 185 can include network-connected devices. In some implementations, a network-connected device can generate information about the environment 20. The network-connected device can include one or more sensors to detect features in the environment 20, such as an acoustic sensor, an image capture system, or other sensor generating signals from which features can be extracted. Network-connected devices can include home cameras, smart sensors, and the like.

In the communication network 185 depicted in FIG. 4 and in other implementations of the communication network 185, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

The smart devices 194a, 194b, 194c are electronic devices in the environment that are nodes in the communication network 185. In some implementations, the smart devices 194a, 194b, 194c include sensors suitable for monitoring the environment, monitoring occupants of the environment, monitoring operations of the robot 100. These sensors can include, for example, imaging sensors, occupancy sensors, environmental sensors, and the like. The imaging sensors for the smart devices 194a, 194b, 194c can include visible light, infrared cameras, sensors employing other portions of the electromagnetic spectrum, etc. The smart devices 194a, 194b, 194c transmit images generated by these imaging sensors through the communication network 185. Occupancy sensors for the smart devices 194a, 194b, 194c include one or more of, for example, a passive or active transmissive or reflective infrared sensor, a time-of-flight or triangulating range sensor using light, sonar, or radiofrequency, a microphone to recognize sounds or sound pressure characteristic of occupancy, an airflow sensor, a camera, a radio receiver or transceiver to monitor frequencies and/or WiFi frequencies for sufficiently strong receive signal strength, a light sensor capable of detecting ambient light including natural lighting and artificial lighting, and/or other appropriate sensors to detect the presence of the user 30 or another occupant within the environment. The occupancy sensors alternatively or additionally detect motion of the user 30 or motion of the robot 100. If the occupancy sensors are sufficiently sensitive to the motion of the robot 100, the occupancy sensors of the smart devices 194a, 194b, 194c generate signals indicative of the motion of the robot 100. Environmental sensors for the smart devices 194a, 194b, 194c can include an electronic thermometer, a barometer, a humidity or moisture sensor, a gas detector, airborne particulate counter, etc. The smart devices 194a, 194b, 194c transmit sensor signals from the combination of imaging sensors, the occupancy sensors, the environmental sensors, and other sensors present in the smart devices 194a, 194b, 194c to the cloud computing system 192. These signals serve as input data for the cloud computing system 192 to perform the processes described herein to control or monitor operations of the robot 100.

In some implementations, the smart devices 194a, 194b, 194c are electronically controllable. The smart devices 194a, 194b, 194c can include multiple states and can be placed in a particular state in response to a command from another node in the communication network 185, e.g., the user 30, the robot 100, the robot 190, or another smart device. The smart devices 194a, 194b, 194c can include, for example, an electronically controllable door with an open state and a closed state, a lamp with an on state, off state, and/or multiple states of varying brightness, an elevator with states corresponding to each level of the environment, or other device that can be placed in different states.

Example Maps

Figure 5:
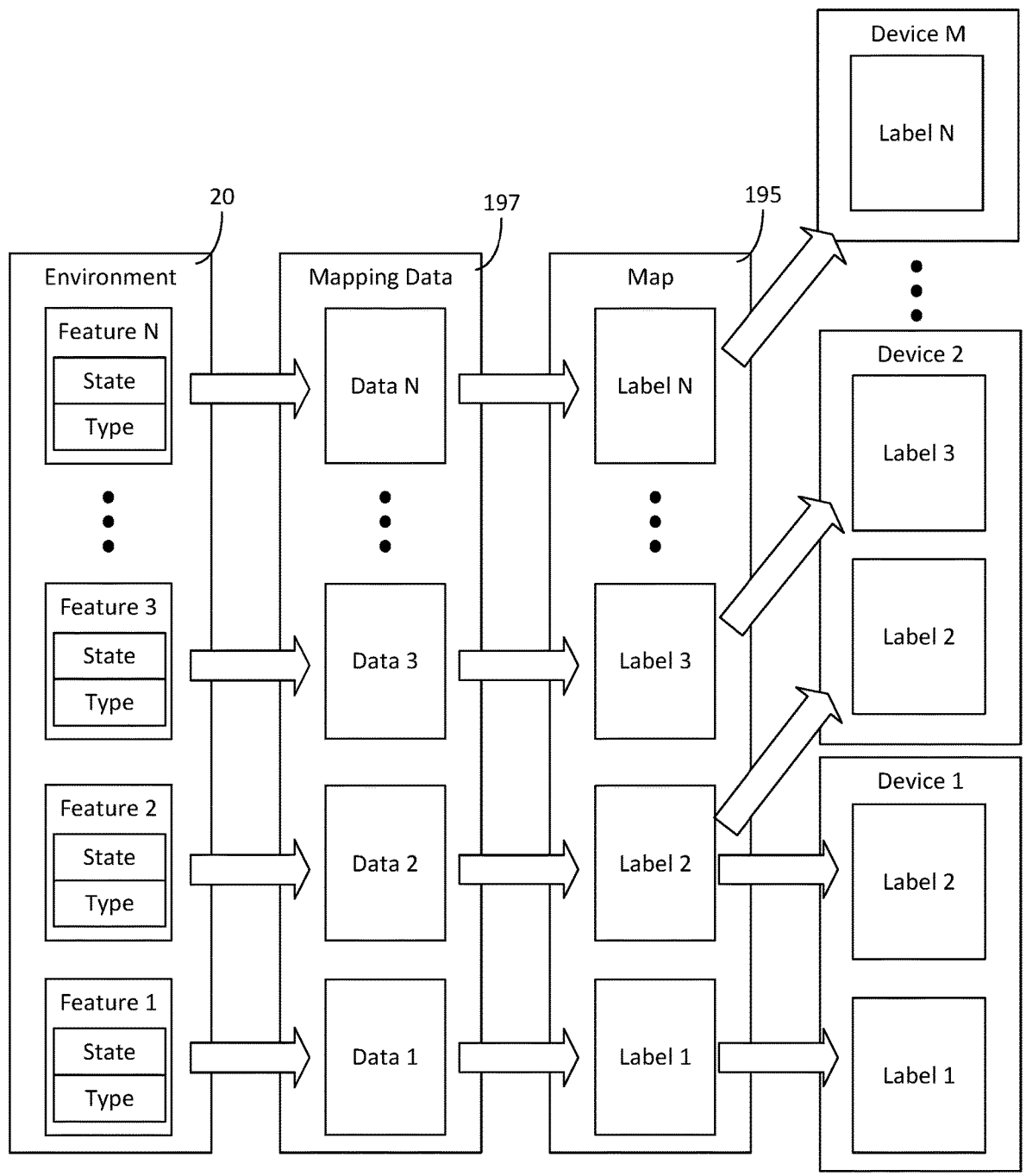
FIG. 5 is a diagram of associations among features in an environment, mapping data, and labels on a map.

As described herein, a map 195 of the environment 20 can be constructed based on data collected by the various nodes of the communication network 185. Referring also to FIG. 5, the map 195 can include multiple labels 1 . . . N associated with features 1 . . . N in the environment 20. Mapping data 197 are produced, and portions of the mapping data 197, i.e., data 1 . . . N, are associated with the features 1 . . . N, respectively, in the environment 20. Then, networked devices 1 . . . M can access the map 195 and use the labels 1 . . . N on the map 195 for controlling operations of the devices 1 . . . M.

The environment 20 can include multiple features, i.e., the features 1 . . . N. In some implementations, each of the features 1 . . . N have corresponding current states and types. A feature, for example, can be in a current state selected from a number of states. The feature also has a type that can be shared with other features having the same type. In some implementations, the feature can have a type in which the current state of the feature can be a permanent state that does not generally change over a period of time, e.g., a month, a year, multiple years, etc. For example, a type of a first feature can be "floor type," and the state of the first feature can be "carpeting." A second feature in the environment can also have a type corresponding to "floor type," and the state of this second feature can be "hardwood." In such implementations, the first and second features have the same type but different states. In some implementations, a feature can have a type in which the current state of the feature can be a temporary state that generally changes over shorter periods of time, e.g., an hour or a day. For example, a type of a first feature can be "door," and the current state of the first feature can be "closed." The first feature can be operated to be placed in an "open" state, and such an operation can generally occur over shorter periods of time. A second feature can also have a type corresponding to "door." Features of the same type can have the same possible states.

For example, the possible states of the second feature, e.g., "open" and "closed," can be identical to the states of the first feature. In some implementations, for a feature having a "door" type, three or more states might be possible, e.g., "closed," "closed and locked," "ajar," "open," etc.

The mapping data 197 represent data indicative of the features 1 ... N in the environment 20. The sets of data 1 ... N of the mapping data 197 can be indicative of the current states and types of the features 1 ... N in the environment 20. The mapping data 197 can be indicative of geometry of an environment. For example, the mapping data 197 can be indicative of a size of a room (e.g., an area or a volume of a room), a dimension of a room (e.g., a width, a length, or a height of a room), a size of an environment (e.g., an area or a volume of an environment), a dimension of an environment (e.g., a width, a length, or a height of a room), a shape of a room, a shape of an environment, a shape of an edge of a room (e.g., an edge defining a boundary between a traversable area and a nontraversable area of a room), a shape of an edge of an environment (e.g., an edge defining a boundary between a traversable area and a nontraversable area of an environment), and/or other geometric features of a room or environment. The mapping data 197 can be indicative of an object in an environment. For example, the mapping data 197 can be indicative of a location of an object, a type of an object, a size of an object, a footprint of an object on a floor surface, whether an object is an obstacle for one or more devices in an environment, and/or other features of an object in the environment.

The mapping data 197 can be produced by different devices in the environment 20. In some implementations, a single autonomous mobile robot produces all of the mapping data 197 using sensors on the robot. In some implementations, two or more autonomous mobile robots produce all of the mapping data 197. In some implementations, two or more smart devices produce all of the mapping data 197. One or more of these smart devices can include an autonomous mobile robot. In some implementations, a user, e.g., the user 30, provides input for producing the mapping data 197. For example, the user can operate a mobile device, e.g., the mobile device 188, to produce the mapping data 197. In some implementations, the user can operate the mobile device to upload imagery indicative of a layout of the environment 20, and the imagery can be used to produce the mapping data 197. In some implementations, the user can provide input indicative of the layout of the environment 20. For example, the user can draw a layout of the environment 20, e.g., using a touchscreen of the mobile device. In some implementations, a smart device used to produce at least some of the mapping data 197 can include a device in the environment 20 including a sensor. For example, the device can include a mobile device, e.g., the mobile device 188. An image capture device, a gyroscope, a global positioning system (GPS) sensor, a motion sensor, and/or other sensors on the mobile device can be used to generate the mapping data 197. The mapping data 197 can be produced as a user carrying the mobile device 188 is moved around the environment 20. In some implementations, the user operates the mobile device 188 to capture imagery of the environment 20, and the imagery can be used to produce the mapping data 197. T The map 195 is constructed based off of the mapping data 197, and includes data indicative of the features 1 ... N. In particular, the sets of data 1 ... N correspond to the labels 1 ... N, respectively. In some implementations, some of the sets of data 1 ... N correspond to sensor data produced using sensors on devices in the environment 20. For example, an autonomous mobile robot (e.g., the robot 100 or the robot 190) can include sensor systems to produce some of the sets of data 1 ... N. Alternatively or additionally, a smart device other than an autonomous mobile robot can include a sensor system to produce some of the sets of data 1 ... N. For example, the smart device can include an image capture device capable of capturing images of the environment 20. The images can serve as mapping data and therefore can make up some of the sets of data 1 ... N. In some implementations one or more of the sets of data 1 ... N can correspond to data collected by multiple devices in the environment 20. For example, one set of data can correspond to a combination of data collected by a first device, e.g., a smart device or an autonomous mobile robot, and data collected by a second device, e.g., another smart device or another autonomous mobile robot. This one of set of data can be associated with a single label on the map 195.

The map 195 corresponds to data usable by various devices in the environment 20 to control operation of these devices. The map 195 can be used to control behaviors of the devices, e.g., autonomous mobile robots in the environment 20. The map 195 can also be used to provide indicators to users through devices, e.g., through a mobile device. The map 195, as described herein, can be labeled with the labels 1 ... N, and these labels 1 ... N can be each usable by some or all of the devices in the environment 20 for controlling behaviors and operations. The map 195 further includes data representative of the states of the features 1 ... N that are associated with the labels 1 ... N.

As described herein, the map 195 can be labeled based on the mapping data 197. In this regard, in implementations in which multiple devices produce the mapping data 197, the labels 1 ... N may be provided based on data from different devices. For example, one label may be provided on the map 195 by mapping data collected by one device, while another label may be provided on the map 195 by mapping data collected by another device.

In some implementations, the map 195 with its labels 1 ... N can be stored on one or more servers remote from the devices in the environment 20. In the example shown in FIG. 4, the cloud computing system 192 can host the map 195, and each of the devices in the communication network 185 can access the map 195. The devices connected to the communication network 185 can access the map 195 from the cloud computing system 192 and use the map 195 to control operations. In some implementations, one or more devices connected to the communication network 185 can produce local maps based on the map 195. For example, the robot 100, the robot 190, the mobile device 188, and the smart devices 194a, 194b, 194c can include maps 196a-196f produced based on the map 195. The maps 196a-196f, in some implementations, can be copies of the map 195. In some implementations, the maps 196a-196f can include portions of the map 195 relevant to operations of the robot 100, the robot 190, the mobile device 188, and the smart devices 194a, 194b, 194c. For example, each of the maps 196a-196f may include a subset of the labels 1 ... N on the map 195, with each subset corresponding to a set of labels relevant to the particular device using the map 196a-196f.

The map 195 can provide the benefit of a single, labeled map that is usable by each of the devices in the environment 20. Rather than the devices in the environment 20 producing separate maps that may contain contradictory information, the devices can reference the map 195, which is accessible by each of the devices. Each of the devices may use a local map, e.g., the maps 196a-196f, but the local maps can be updated as the map 195 is updated. The labels on the maps 196a-196f are consistent with the labels 1 ... N on the map 195. In this regard, data collected by the robot 100, the robot 190, the mobile device 188, and the smart devices 194a, 194b, 194c can be used to update the map 195, and any updates to the map 195 can be easily used to update the labels 1 ... N each of the maps 196a-196f that includes the updated label. For example, the robot 190 can generate mapping data used to update the labels 1 ... N on the map 195, and these updates to the labels 1 ... N on the map 195 can be propagated to labels on the map 196a of the robot 100. Similar, in another example, in implementations in which the smart devices 194a, 194b, 194c include sensors to produce mapping data, the smart devices 194a, 194b, 194c can produce mapping data that are used to update the labels on the map 195. Because the labels on the maps 195, 196a-196f are consistent with one another, the updates to these labels on the map 195 can be easily propagated to, for example, the map 196a of the robot 100 and the map 196b of the robot 190.

The devices 1 ... M can receive at least a portion of the map 195, including at least some of the labels 1 ... N. In some implementations, one or more of the devices 1 ... M is an autonomous mobile robot, e.g., the robot 100. The robot that can initiate a behavior associated with one of the labels 1 ... N. The robot can receive a subset of the labels 1 ... N and can initiate a corresponding behavior associated with each label in the subset. Since the labels 1 ... N are associated with the features 1 ... N in the environment 20, the behaviors initiated by the robot can be responsive to the features, e.g., to avoid the feature, to follow a certain path relative to the feature, to use a certain navigational behavior when the robot is proximate to the feature, to use a certain cleaning behavior when the robot is proximate to the feature or is on the feature. In addition, a portion of the map received by the robot can be indicative of a state or a type of the feature. The robot accordingly can initiate certain behaviors responsive to the feature, to the current state of the feature, to the type of the feature, or a combination thereof.

In some implementations, one or more of the devices is a mobile device, e.g., the mobile device 188. The mobile device can receive a subset of the labels 1 ... N and provide feedback to the user based on the subset of the labels 1 ... N. The mobile device can present auditory, tactile, or visual indicators indicative of the labels 1 ... N. The indicators presented by the mobile device can be indicative of locations of the features, current states of the features, and/or types of the features.

In the example depicted in FIG. 5, device 1 receives at least a portion of the map 195 and data representing the label 1 and the label 2. The device 1 does not receive data representing labels 3 ... N. Device 2 also receives at least a portion of the map 195. Like the device 1, the device 2 also receives data representing the label 2. Unlike the device 1, the device 2 receives data representing the label 3. Finally, the device M receives at least a portion of the map 195 and data representing the label N.

Example Processes

The robot 100, the robot 190, the mobile device 188, and the smart devices 194a, 194b, 194c can be controlled in certain manners in accordance with processes described herein. While some operations of these processes may be described as being performed by the robot 100, by a user, by a computing device, or by another actor, these operations may, in some implementations, be performed by actors other than those described. For example, an operation performed by the robot 100 can be, in some implementations, performed by the cloud computing system 192 or by another computing device (or devices). In other examples, an operation performed by the user 30 can be performed by a computing device. In some implementations, the cloud computing system 192 does not perform any operations. Rather, other computing devices perform the operations described as being performed by the cloud computing system 192, and these computing devices can be in direct (or indirect) communication with one another and the robot 100. And in some implementations, the robot 100 can perform, in addition to the operations described as being performed by the robot 100, the operations described as being performed by the cloud computing system 192 or the mobile device 188. Other variations are possible. Furthermore, while the methods, processes, and operations described herein are described as including certain operations or sub-operations, in other implementations, one or more of these operations or sub-operations may be omitted, or additional operations or sub-operations may be added.

Figure 6:
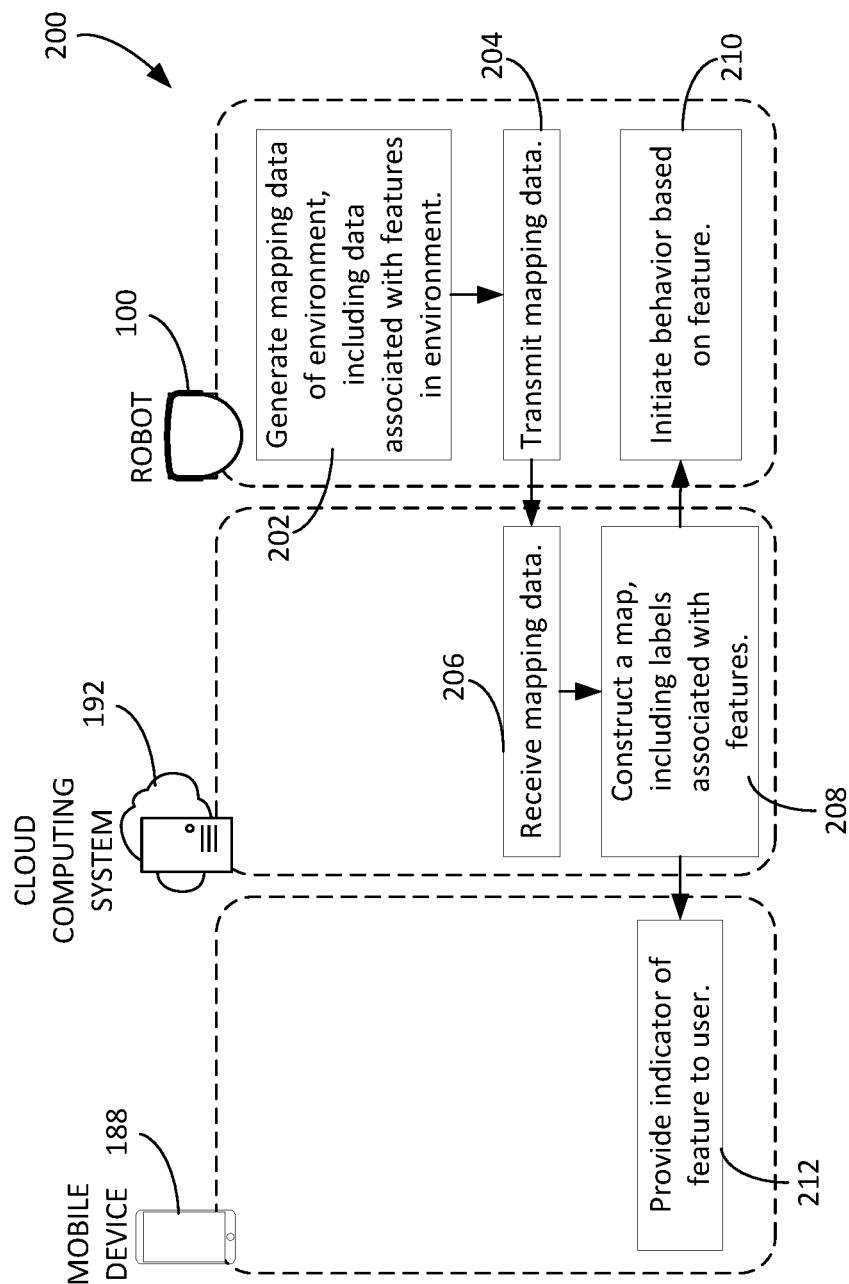
FIG. 6 is a block diagram of a process for providing an indicator of a feature in an environment to a user or for initiating a behavior based on a feature in an environment.

FIG. 6 illustrates a flowchart of a process 200 of using a map of an environment, e.g., the environment 20 (shown in FIG. 1A), to, for example, control an autonomous mobile robot and/or to control a mobile device. The process 200 includes operations 202, 204, 206, 208, 210, 212. The operations 202, 204, 206, 208, 210, 212 are shown and described as being performed by the robot 100, the cloud computing system 192, or the mobile device 188, but as described herein, in other implementations, the actors performing these operations may vary.

At the operation 202, mapping data of the environment are generated. The mapping data generated at the operation 202 includes data associated with features in the environment, e.g., walls in the environment, locations of smart devices, dirty areas, obstacles in the environment, objects in the environment, clutter in the environment, floor types, the docking station 60, or regions that may cause error conditions for autonomous mobile robots in the environment. As described herein with respect to FIG. 5, the mapping data can be generated using sensors on devices in the environment. In the example shown in FIG. 6, the robot 100 can generate the mapping data using the sensor system of the robot 100, e.g., the sensor system described with respect to FIGS. 2, 3A, and 3B.

At the operation 204, the mapping data are transmitted from the robot 100 to the cloud computing system 192. At the operation 206, the mapping data are received by the cloud computing system 192 from the robot 100. In some implementations, the robot 100 transmits the mapping data during a cleaning mission. For example, the robot 100 can transmit mapping data to the cloud computing system 192 as the robot 100 generates the mapping data at the operation 202. In some implementations, the robot 100 transmits the mapping data after completing a cleaning mission. For example, the robot 100 can transmit the mapping data when the robot 100 is docked at the docking station 60.

At the operation 208, a map is constructed, the map including labels associated with the features in the environment is generated. The labels are each associated with a portion of the mapping data generated by the robot 100 at the operation 202, The cloud computing system 192 can generate these labels. As described herein, each feature can have a corresponding label generated at the operation 208.

After the operation 208, the operation 210 and/or the operation 212 can be performed. At the operation 210, the robot 100 initiates a behavior based on a feature associated with one of the labels. The robot 100 can generate the mapping data at the operation 202 during a first cleaning mission, and can initiate the behavior at the operation 210 in a second cleaning mission. In this regard, the map constructed at the operation 208 can represent a persistent map that the robot 100 can use across multiple discrete cleaning missions. The robot 100 can collect mapping data in each cleaning mission and can update the map constructed at the operation 208 as well as the labels on the map provided at the operation 208. The robot 100 can update the map with newly collected mapping data in subsequent cleaning missions.

At the operation 212, the mobile device 188 provides, to a user, an indicator of a feature associated with one of the labels. For example, the mobile device 188 can provide a visual representation of the map constructed at the operation 208. The visual representation can be indicative of a visual arrangement of objects in the environment 20, e.g., an arrangement of walls and obstacles in the environment 20. The indicator of the feature can be indicative of a location of the feature and can be indicative of a current state and/or a type of the feature, as described herein. The visual representation of the map of the environment 20 and the indicator of the feature can be updated as additional mapping data is collected.

Illustrative examples of autonomous mobile robots controlling their operations based on maps and labels provided on the maps can be described with respect to FIGS. 1A-1B, 7A-7D, 8A-8B, 9A-9D, 10A-10B, and 11A-11D. Referring back to FIG. 1A, the robot 100 can produce the mapping data, e.g., the mapping data 197 described in connection with FIG. 5, used to construct the map, e.g., the map 195 described in connection with FIG. 5. In some implementations, the environment 20 contains other smart devices usable to produce mapping data for constructing the map. For example, the environment 20 includes an image capture device 70a and an image capture device 70b that are operable to capture imagery of the environment 20. The imagery of the environment 20 can also be used as mapping data for constructing the map. In other implementations, further smart devices in the environment 20, as described herein, can be used to generate mapping data for constructing the map.

The robot 100 generates mapping data as the robot 100 is maneuvered about the environment 20 and is operated to clean the floor surface 10 in the environment 20. The robot 100 can generate mapping data indicative of the arrangement of walls and obstacles in the environment 20. In this regard, these mapping data can be indicative of traversable and nontraversable portions of the floor surface 10. The mapping data generated by the robot 100 can be indicative of other features in the environment 20 as well. In the example shown in FIG. 1A, the environment 20 includes the dirty areas 52a, 52b, 52c, corresponding to regions on the floor surface 10. The dirty areas 52a, 52b, 52c can be detected by the robot 100, e.g., using a debris detection sensor of the robot 100. The robot 100 can detect the dirty areas 52a, 52b, 52c during a first cleaning mission. In detecting these dirty areas 52a, 52b, 52c, the robot 100 generates a portion of the mapping data.

This portion of the mapping data can also be indicative of a current state of the dirty areas 52a, 52b, 52c. The numbers of possible states of the dirty areas 52a, 52b, 52c are the same. As visually represented by the indicators 66c, 66d, 66e, the current states of the dirty areas 52a, 52b, 52c can differ from one another. The states of the dirty areas 52a, 52b, 52c correspond to first, second, and third levels of dirtiness. The state of the dirty area 52a is a "high dirtiness" state, the state of the dirty area 52b is a "medium dirtiness" state, and the state of the dirty area 52c is a "low dirtiness" state. In other words, the dirty area 52a is dirtier than the dirty area 52b, and the dirty area 52b is dirtier than the dirty area 52c.

In the first cleaning mission, the robot 100 can initiate focused cleaning behaviors in each of the dirty areas 52a, 52b, 52c in response to detection of debris in the dirty areas 52a, 52b, 52c during the first mission. For example, in response to detecting debris in the dirty area 52a, 52b, 52c, the robot 100 can initiate focused cleaning behaviors to perform a focused cleaning of the dirty areas 52a, 52b, 52c. In some implementations, based on the amount of debris detected in the dirty areas 52a, 52b, 52c or a rate of debris collected by the robot 100 in the dirty areas 52a, 52b, 52c, the robot 100 can provide different degrees of cleaning to the dirty areas 52a, 52b, 52c. The degree of cleaning for the dirty area 52a can be greater than the degree of cleaning for the dirty area 52b, and the degree of cleaning for the dirty area 52c.

The mapping data, particularly the mapping data indicative of the dirty areas 52a, 52b, 52c, collected during the first cleaning mission can be used to control behaviors of the robot 100 in a second cleaning mission. During the second cleaning mission, the robot 100 can initiate focused cleaning behaviors to provide a focused cleaning to the dirty areas 52a, 52b, 52c based on detection of debris in the dirty areas 52a, 52b, 52c during the first cleaning mission. As described herein, detection of debris in the dirty areas 52a, 52b, 52c during the first cleaning mission can be used to provide the labels on the map that are usable to control the robot 100 in the second cleaning mission. In particular, the robot 100 can receive the labels produced using the mapping data collected during the first cleaning mission. During the second cleaning mission, the robot 100 can initiate the focused cleaning behaviors based on the labels on the map. The robot 100 initiates a focused cleaning behavior in response to detecting that the robot 100 is within the dirty area 52a, 52b, or 52c.

In some implementations, during the second cleaning mission, the robot 100 initiates the focused cleaning behaviors for the dirty areas 52a, 52b, 52c without first detecting the debris in the dirty areas 52a, 52b, 52c in the dirty areas 52a, 52b, 52c during the second cleaning mission. If the robot 100 detects amounts of debris in the dirty areas 52a, 52b, 52c during the second cleaning mission that differ from the amounts of debris in the dirty areas 52a, 52b, 52c during the first cleaning mission, the robot 100 can generate mapping data that can be used to update the labels for the dirty areas 52a, 52b, 52c. In some implementations, the map can be updated such that the current states of the dirty areas 52a, 52b, 52c are updated to reflect the current levels of dirtiness of the dirty areas 52a, 52b, 52c. In some implementations, based on mapping data from the second cleaning mission or further cleaning missions, the map can be updated to remove a label for a dirty area, for example, due to the dirty area no longer having a level of dirtiness amounting to at least a "low dirtiness" state for dirty areas.

Figure 7A:
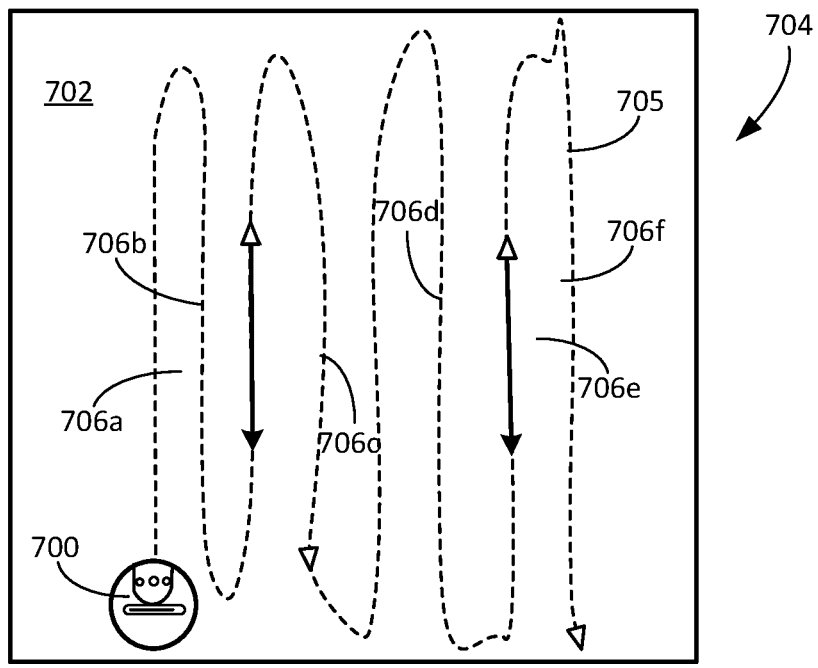
FIGS. 7A-7D, 8A-8B, 9A-9D, 10A-10B, 11A-11D are schematic top views of environments with autonomous cleaning robots.

FIGS. 7A-7D illustrate another example of an autonomous cleaning robot using a labeled map for controlling cleaning behavior for dirty areas. Referring to FIG. 7A, an autonomous cleaning robot 700 (similar to the robot 100) initiates a first cleaning mission to clean a floor surface 702 in an environment 704. In some implementations, in performing the first cleaning mission, the robot 700 moves along a path 705 including multiple substantially parallel rows, e.g., rows extending along axes forming minimum angles of at most five to ten degrees of one another, to cover the floor surface 702. The path that the robot 700 follows can be selected such that the robot 700 passes through the traversable portions of the floor surface 702 at least once. During the first cleaning mission, the robot 700 detects sufficient debris to trigger focused cleaning behavior at locations 706a-706f.

Figure 7B:
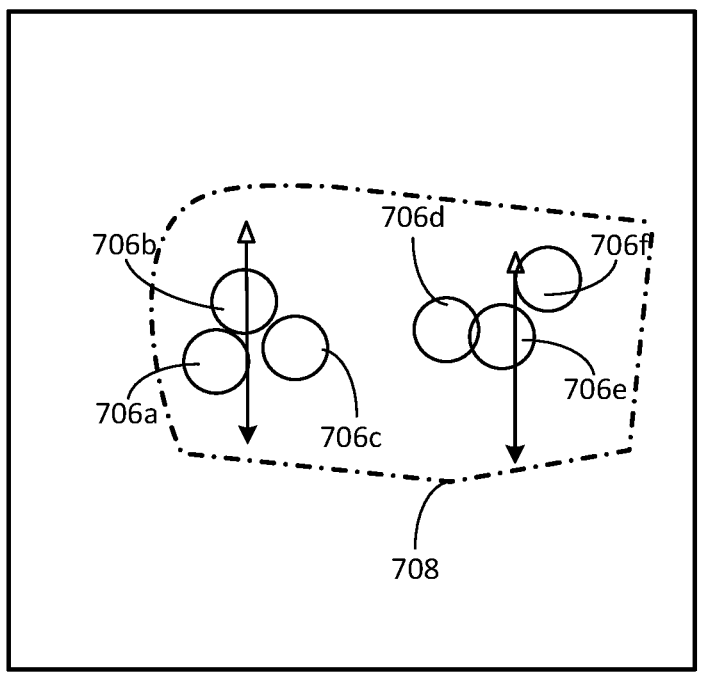

Referring to FIG. 7B, mapping data collected by the robot 700 can be used to construct a map of the environment 704, and at least a portion of mapping data produced by the robot 700 can be used to provide a label on the map indicative of a dirty area 708. For example, in some implementations, a region corresponding to the dirty area 708 can be designated, e.g., by a user operating a mobile device, and then the region can be labeled to indicate that the region corresponds to the dirty area 708. Alternatively, a region corresponding to the dirty area 708 can be automatically labeled. The dirty area 708 can include at least the locations 706a-706f. In some implementations, a width of the dirty area 708 is greater than, e.g., 5 to 50%, 5% to 40%, 5% to 30%, or 5% to 20% greater than, a greatest widthwise distance between the locations 706a-706f, and a length of the dirty area 708 is greater than a greatest lengthwise distance between the locations 706a-706f. In some implementations, the dirty area 708 is no more than 10% to 30% of an overall area of a traversable portion of the environment 704, e.g., no more than 10% to 20%, 15% to 25%, or 20% to 30% of the overall area of the traversable portion of the environment 704

Figure 7C:
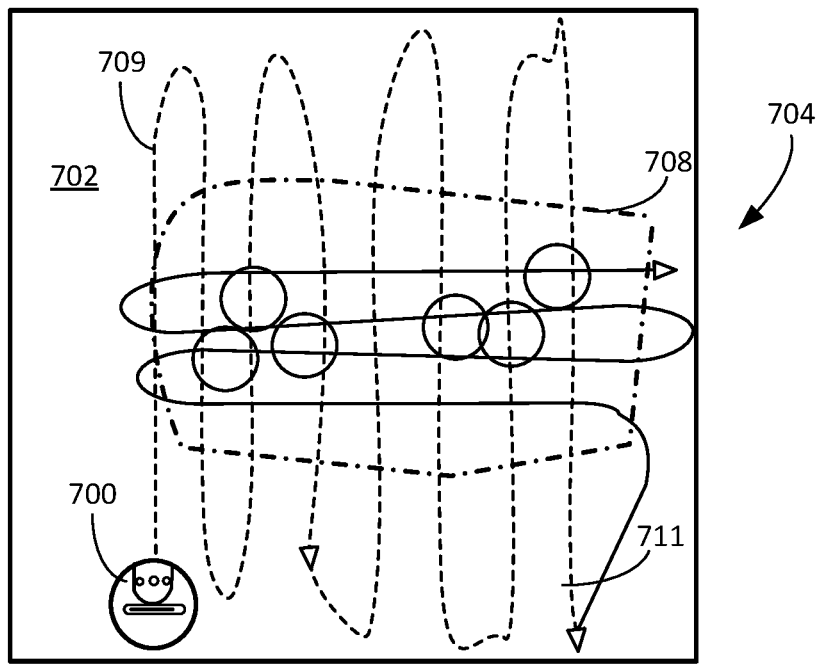
Figure 7D:
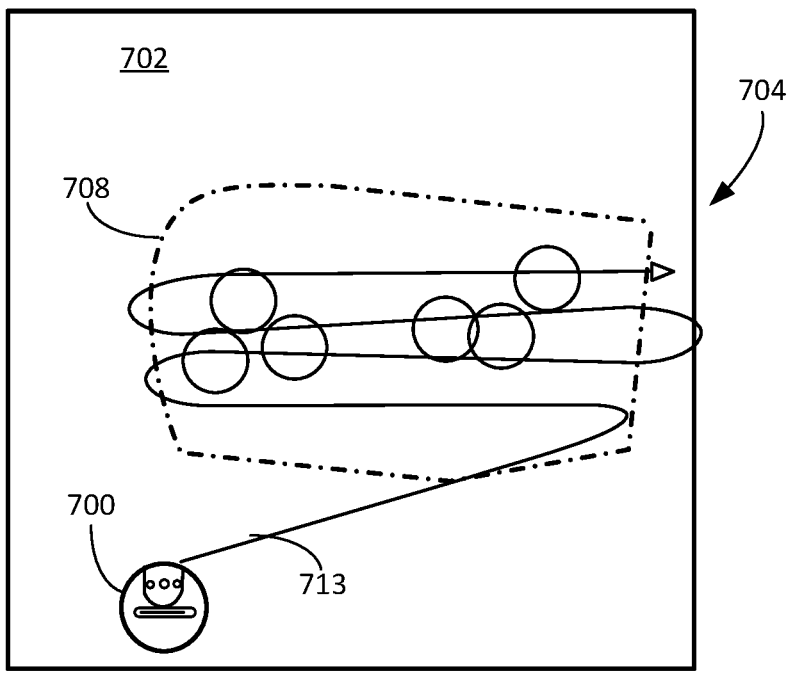

A label for the dirty area 708 can then be used by the robot 700 in a second cleaning mission to initiate a focused cleaning behavior to perform a focused cleaning of the dirty area 708. Referring to FIG. 7C, in some implementations, in the second cleaning mission, the robot 700 follows along a path 709 including multiple substantially parallel rows similar to the path 705 of FIG. 7A. The robot 700 travels and cleans along the path 709 to cover the floor surface 702. Then, after completing the path 709, to perform a focused cleaning of the dirty area 708, the robot 700 initiates a focused cleaning behavior in which the robot 700 travels along a path 711 extending over the dirty area 708 such that the robot 700 cleans the dirty area 708 again. The robot 700 initiates this focused cleaning behavior based on the label for the dirty area 708 on the map. Alternatively, referring to FIG. 7D, in the second cleaning mission, based on the label for the dirty area 708, the robot 700 initiate a behavior in which the robot 700 performs a focused cleaning of the dirty area 708 without covering most of the traversable portions of the floor surface 702 in the environment 704 such that the robot 700 need not spend the time to clean other portions of the traversable portions the floor surface 702 in the environment 704. Rather than having to travel along a path to cover most of the traversable portions of the floor surface 702 (e.g., the path 709), the robot 700, upon initiating the second cleaning mission, moves along a path 713 to move to the dirty area 708 and then cover the dirty area 708 to clean the dirty area 708.

Figure 8A:
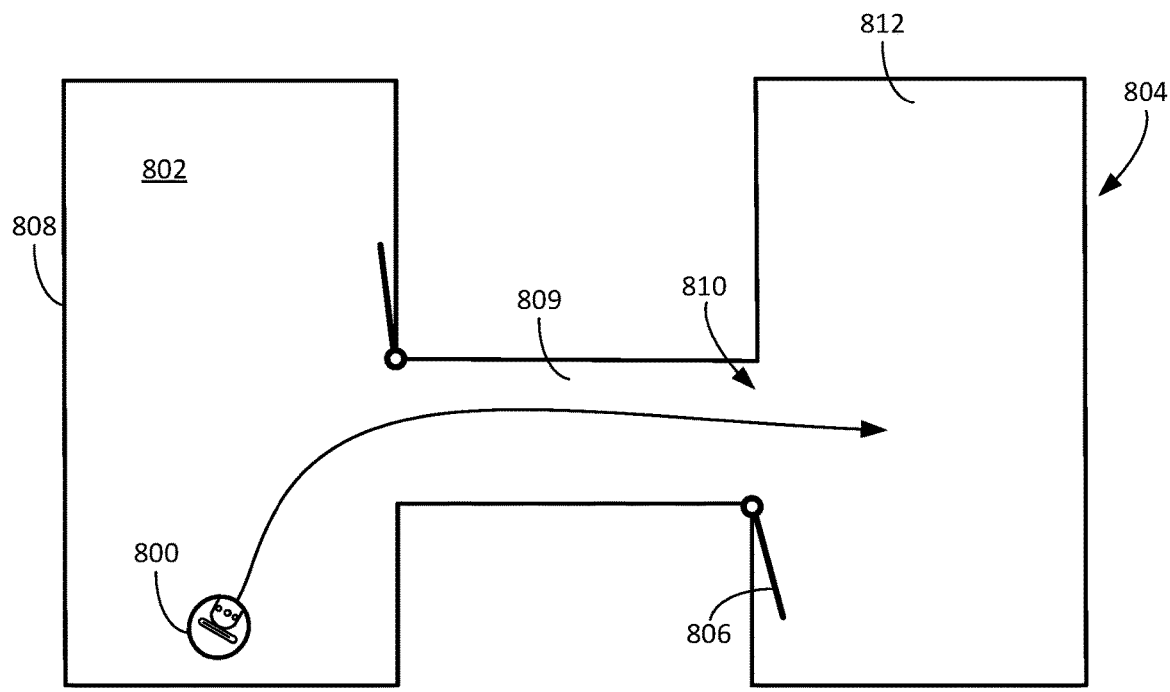
Figure 8B:
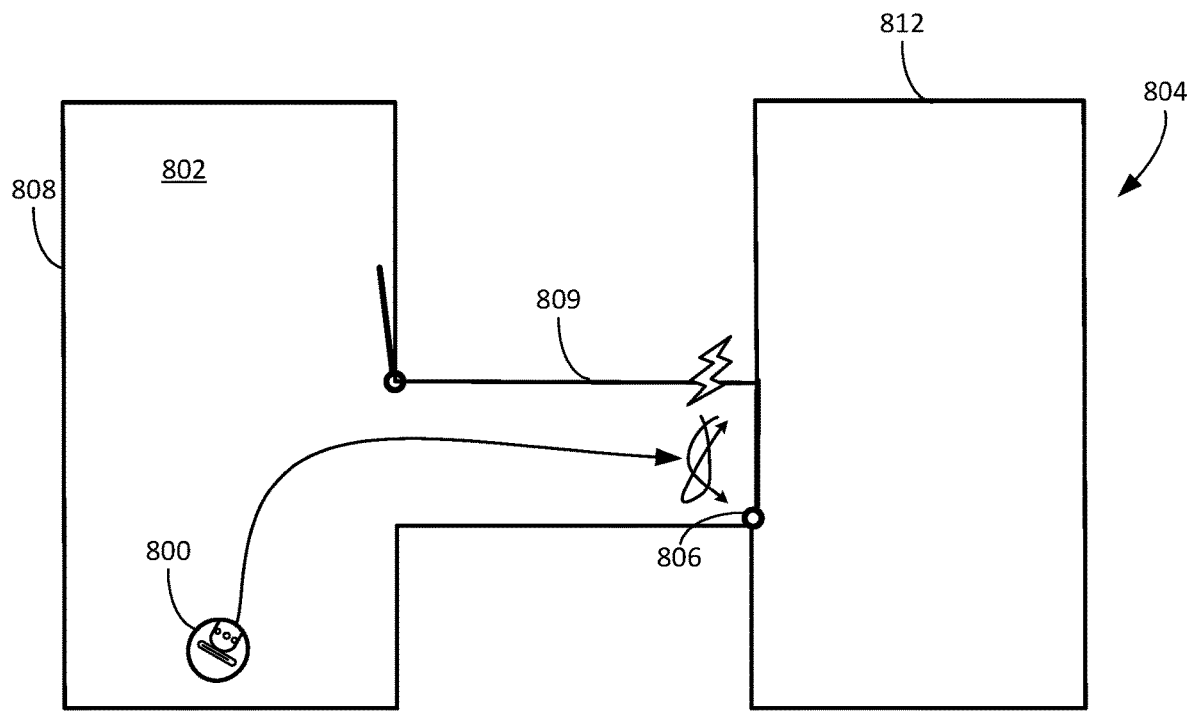

While data indicative of the debris in the dirty areas 52a, 52b, 52c can correspond to a portion of the mapping data used to construct the map and its labels, in other implementations, data indicative of a navigational behavior of the robot 100 can correspond to a portion of the mapping data. FIGS. 8A-8B illustrate an example in which an autonomous cleaning robot 800 (similar to the robot 100) moves along a floor surface 802 in an environment 804 and detects a door 806. Referring to FIG. 8A, the robot 800, during a first cleaning mission, is able to move from a first room 808, through a hallway 809, through a doorway 810, into a second room 812. The door 806, during the first cleaning mission, is in an open state. Referring to FIG. 8B, during a second cleaning mission, the robot 800 moves from the first room 808, through the hallway 809, and then encounters the door 806. The robot 800 detects the door 806, e.g., using its sensor system, its obstacle detection sensors, or an image capture device, and detects that the door 806 is in the closed state because the robot 800 is unable to move from the hallway 809 into the second room 812.

The mapping data provided by the robot 800 can be used to produce a label for the door 806, and provide data indicating that the door 806 is in the closed state. In some implementations, when the door 806 is indicated to be in the closed state, the robot 800 can maneuver relative to the door 806 in a manner in which the robot 800 avoids contacting the door 806. For example, rather than contacting the door 806 and triggering a bump sensor of the robot 800, the robot 800 can move along the door 806 without contacting the door 806 if the door 806 is in the closed state. A planned path by the door 806 can account for the closed state of the door 806 such that the robot 800 need not detect the state of the door 806 during the mission using the bump sensor of the robot 800. The robot 800 can detect the state of the door to confirm that the door 806 is indeed in the closed state, e.g., using a proximity sensor or other sensor of the sensor system of the robot 800. In some implementations, in its initial encounter with the door 806 before a state of the door 806 is indicated in the map, the robot 800 can attempt to move beyond the door 806 by contacting the door 806 and following along the door 806 while contacting the door 806 multiple times. Such behavior can produce mapping data that is usable to indicate on the map that the door 806 is in the closed state. When the robot 800 is near the door 806 during a cleaning mission a subsequent time, e.g., in a subsequent cleaning mission or in the same cleaning mission, the robot 800 can make fewer attempts to move beyond the door 806. In particular, the robot 800 can detect that the door 806 is in the closed state to confirm that its state as indicated in the map is correct and then to proceed to move relative to the door 806 as though the door 806 is nontraversable obstacle.

In some implementations, a request to move the door 806 into the open state can be issued to the user so that the robot 800 can clean the second room 812. In some implementations, if the door 806 is a smart door, the robot 800 can provide an instruction through a communication network (similar to the communication network 185 described herein) to cause the door 806 to move into the open state. The door 806 can be an electronically controllable door, and the robot 800 can transmit data to cause the door 806 to move from the closed state to the open state.

FIGS. 9A-9D illustrate an example of an autonomous cleaning robot 900 (similar to the robot 100) that performs a navigational behavior along a floor surface 902 based on a label for a region 906 in an environment 904. The region 906 can be, for example, an elevated portion of the floor surface 902 (similar to the elevated portion 54 described herein) that cannot be easily traversed by the robot 900 if the robot 900 attempts to traverse it with certain navigational parameters, e.g., a certain angle of approach, a certain speed, or a certain acceleration. The robot 900 can, in some cases, be placed into an error condition as the robot 900 attempts to cross over the elevated portion. For example, one of the cliff sensors of the robot 900 can be triggered as the robot 900 crosses over the elevated portion, thereby triggering the error condition and causing the robot 900 to stop the cleaning mission. In further examples, the region 906 can correspond to a region containing a length of cord or another flexible member that can be entrained in the rotatable members of the robot 900 or the wheels of the robot 900. This can trigger an error condition of the robot 900.

Figure 9A:
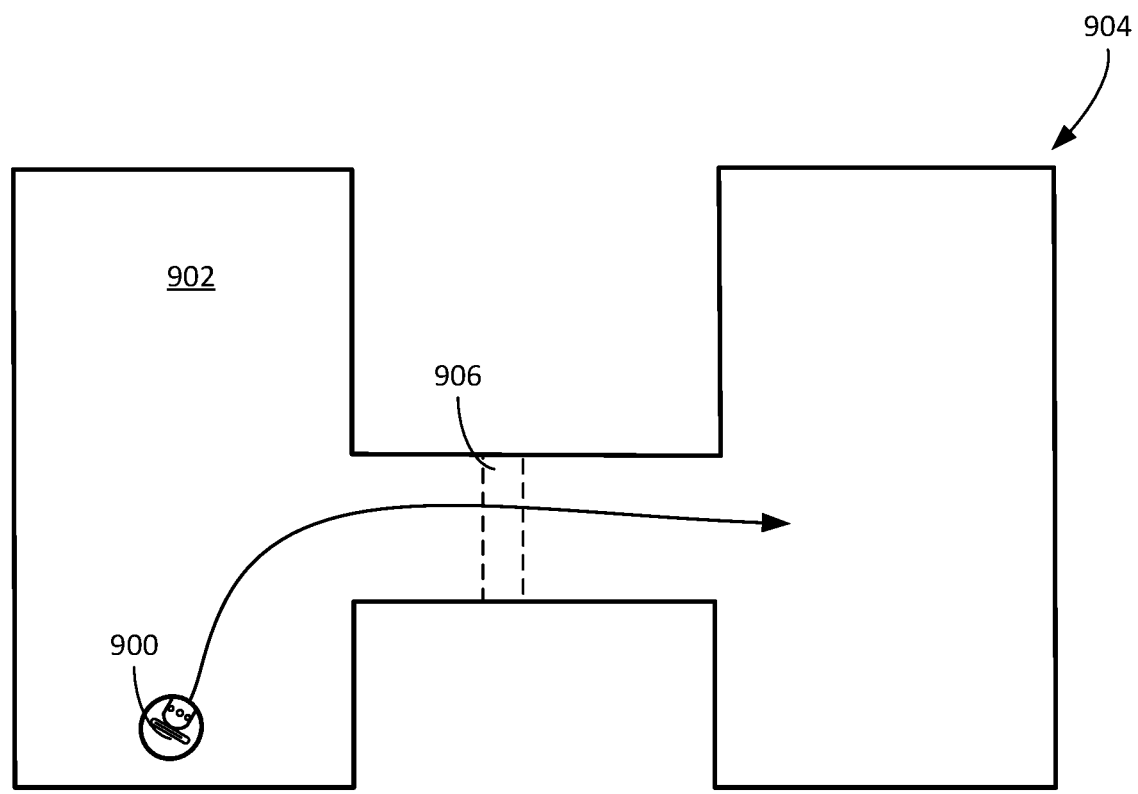

Referring to FIG. 9A, during a first cleaning mission, the robot 900 successfully moves across the region 906. Mapping data produced by the robot 900 in the first cleaning mission are indicative of navigational parameters of the robot 900 as the robot 900 cross the region 906 successfully. The map that is constructed from the mapping data includes the label associated with region 906, as well as information indicative of a first set of navigational parameters. These navigational parameters can include an angle of approach relative to the region 906, a speed, or an acceleration. The first set of navigational parameters are associated with a successful attempt to cross the region 906.

Figure 9B:
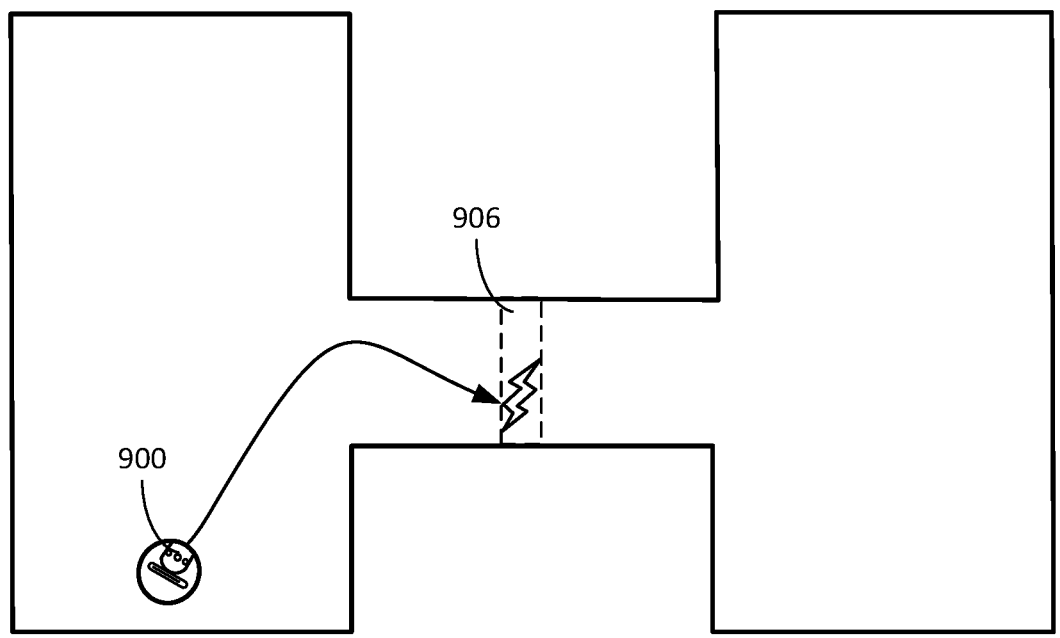

Referring to FIG. 9B, in a second cleaning mission, the robot 900 unsuccessfully attempts to cross the region 906. Mapping data produced by the robot 900 in the second cleaning mission are indicative of navigational parameters of the robot 900 as the robot 900 attempts to cross the region 906 unsuccessfully. The map is updated to associate the label with information indicative of a second set of navigational parameters. The second set of navigational parameters are associated with an error condition. In this regard, based on the label and the second set of navigational parameters, the robot 900 can avoid the error condition by avoiding the second set of navigational parameters in a subsequent cleaning mission.

Figure 9C:
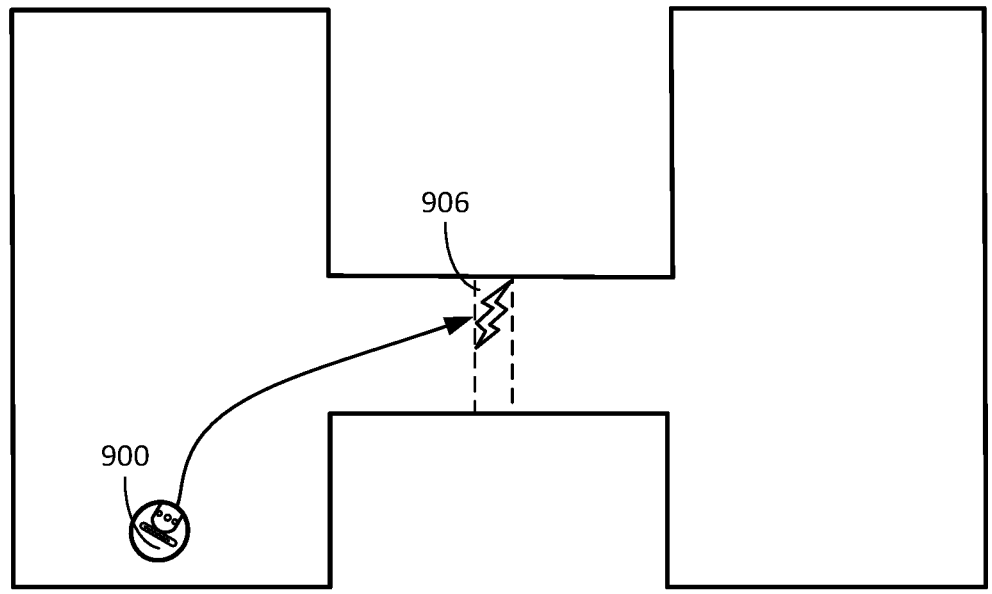

Referring to FIG. 9C, in a third cleaning mission, the robot 900 unsuccessfully attempts to cross the region 906. Mapping data produced by the robot 900 in the third cleaning mission are indicative of navigational parameters of the robot 900 as the robot 900 attempts to cross the region 906 unsuccessfully. The map is updated to associate the label with information indicative of a third set of navigational parameters. The third set of navigational parameters are associated with an error condition. In this regard, based on the label and the third set of navigational parameters, the robot 900 can avoid the error condition by avoiding the third set of navigational parameters in a subsequent cleaning mission.

Figure 9D:
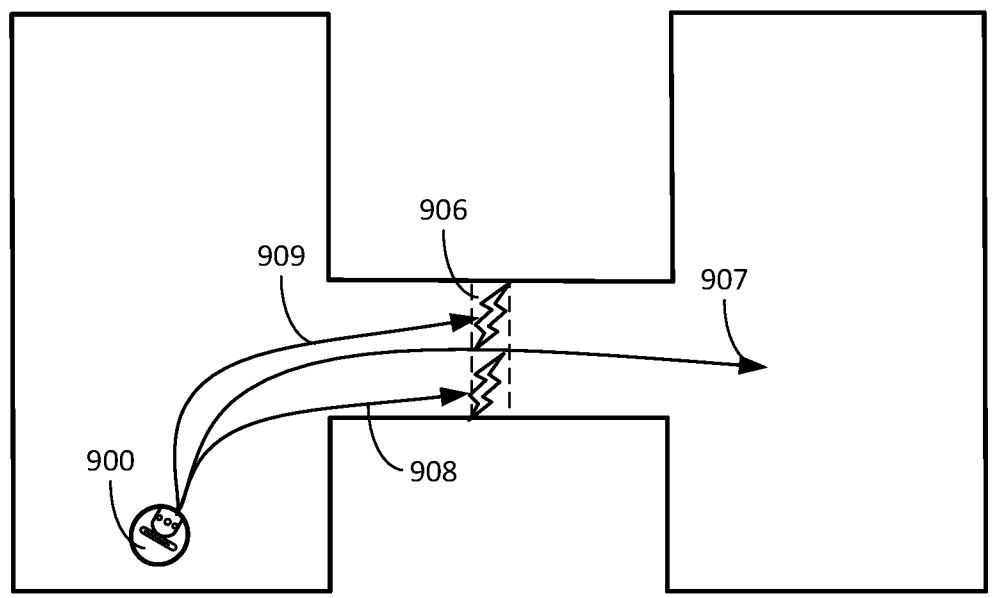

Referring to FIG. 9D, in a fourth cleaning mission, the robot 900 successfully crosses the region 906. The robot 900 can, for example, based on the label and one or more of the first, second, or third sets of navigational parameters, select a fourth set of navigational parameters.

The robot 900 can avoid a second path 908 associated with the second set of navigational parameters, and a third path 909 associated with the third set of navigational parameters, and instead select a first path 907 associated with the first set of navigational parameters. This fourth set of navigational parameters can be calculated based on two or more of the first, second, or third sets of navigational parameters. For example, based on the first, second, and third sets of navigational parameters, a range of values for the navigational parameters that would likely result in the robot 900 successfully crossing the region 906 can be computed. Alternatively, the fourth set of navigational parameters can be the same as the first set of navigational parameters that were successful for crossing the region 906 during the first cleaning mission.

Figure 10A:
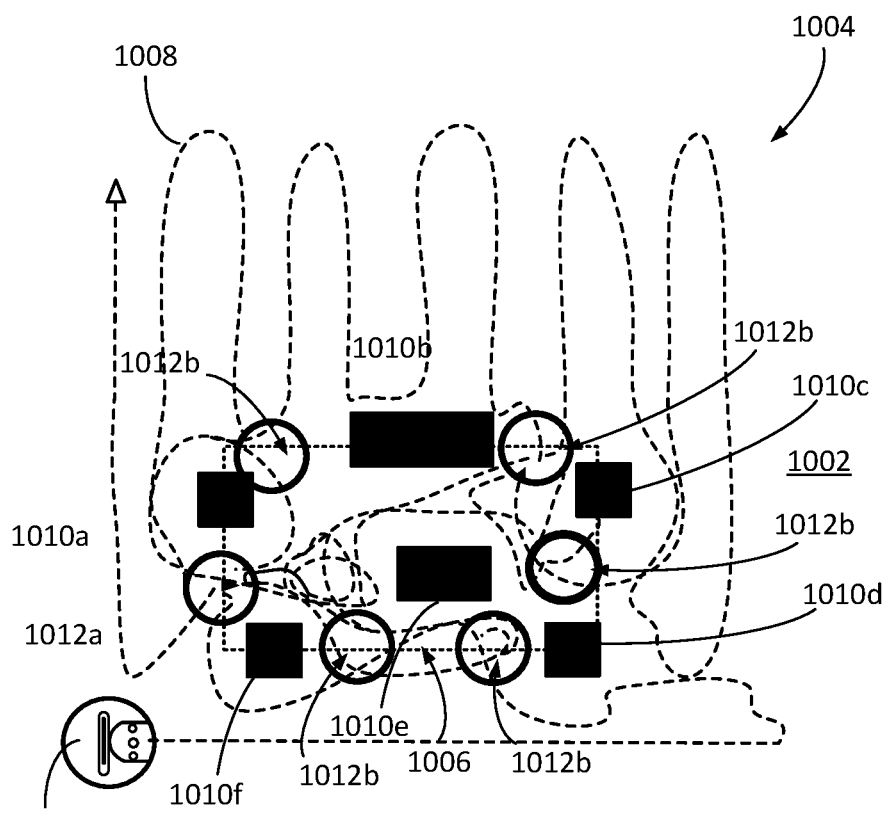
Figure 10B:
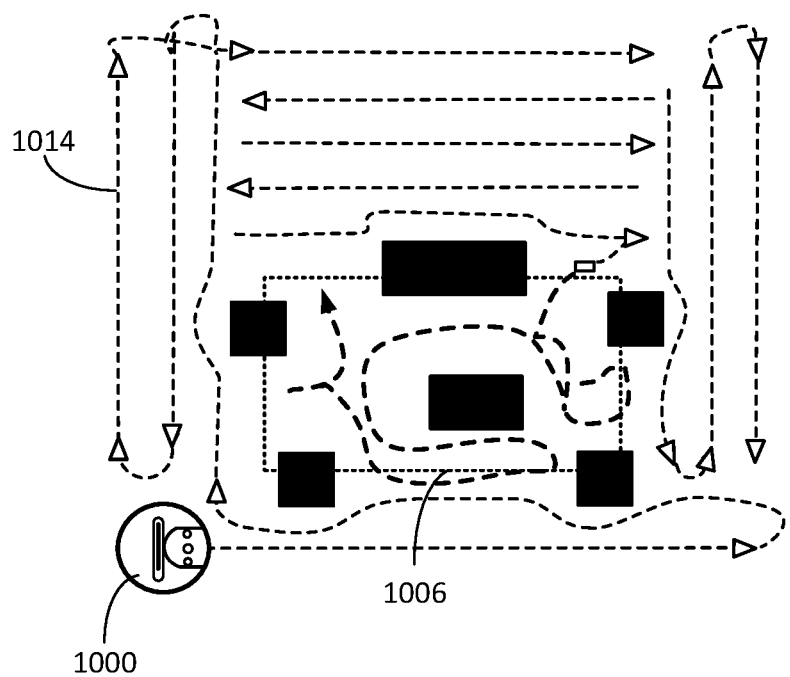

FIGS. 10A-10B illustrate an example of an autonomous cleaning robot 1000 (similar to the robot 100) that performs a navigational behavior along a floor surface 1002 based on a label for a region 1006 in an environment 1004. Referring to FIG. 10A, during a first cleaning mission, the robot 1000 in a first navigational behavior moves along a path 1008 along the floor surface 1002. The robot 1000 initiates a coverage behavior in which the robot 1000 attempts to move along multiple substantially parallel rows along the floor surface 1002 to cover the floor surface 1002. The robot 1000 encounters obstacles 1010a-1010f proximate to the region 1006, and avoids the obstacles 1010a-1010f in response to detecting the obstacles, e.g., using the sensor system of the robot 1000. The robot 1000 can clean around the obstacles by following edges of the obstacles using its sensors. In this regard, the path 1008 of the robot 1000 includes multiple instances in which the robot 1000 initiates obstacle avoidance behavior to avoid the obstacles 1010a-1010f and initiates obstacle following behavior to clean around the obstacles 1010a-1010f. In addition, the robot 1000 enters and exits the region 1006 through multiple pathways of entry and exit 1012a-1012f. In the example shown in FIG. 10A, the region 1006 contains six pathways of entry and exit 1012a-1012f, and the robot 1000 enters and exits the region 1006 through at least some of these points multiple times.

A label associated with the region 1006 can be provided on the map constructed from mapping data produced by the robot 1000. The label can indicate that the region 1006 is a clutter region including multiple closely-spaced obstacles that result in several narrow pathways of entry and exit. For example, the multiple pathways of entry and exit 1012a-1012f can have a width between one and two widths of the robot 1000. The clutter region can be defined in part by distances between the obstacles. For example, a length of the clutter region can be greater than a distance between the two obstacles farthest spaced from one another along a first dimension, and a width of the clutter region can be greater than a distance between the two obstacle farthest spaced from one another along a second dimension. The first dimension can be perpendicular to the first dimension. In some implementations, a clutter region can cover a region having a length of 1 to 5 meters, e.g., 1 to 2 meters, 2 to 3 meters, 3 to 4 meters, 4 to 5 meters, about 2 meters, about 3 meters, about 4 meters, etc., and a width of 1 to 5 meters, e.g., 1 to 2 meters, 2 to 3 meters, 3 to 4 meters, 4 to 5 meters, about 2 meters, about 3 meters, about 4 meters, etc.

Referring to FIG. 10B, during a second cleaning mission, the robot 1000 can plan a path 1014 that can more quickly clean the region 1006. In addition to using the sensor system of the robot 1000 to detect the obstacles 1010a-1010f (shown in FIG. 10A) and then avoiding the obstacles 1010a-1010f based on detecting the obstacles 1010a-1010f, the robot 1000 can initiate a cleaning behavior based on previous identification of the clutter field. The robot 1000 can rely on the map produced during the first cleaning mission and plan the path 1014 rather than only using obstacle detection sensors to initiate behaviors in response to detecting the obstacles 1010a-1010f. The portion of the path 1014 is more efficient than the path 1008. In a second navigational behavior that is selected at least partially based on the first navigational behavior, the robot 1000 moves along the path 1014 during the second cleaning mission. In this second navigational behavior, the robot 1000 enters the region 1006 fewer times than the robot enters the region in the first navigational behavior. In particular, a number of entry points into the region 1006 for the path 1014 is less than a number of entry points into the region 1006 for the path 1008. In addition, the path 1014 can include multiple substantially parallel rows that are also substantially parallel to a length of the region 1006. In contrast, the path 1008 includes multiple substantially parallel rows that are perpendicular to the region 1006. Rather than initiating obstacle avoidance behavior and obstacle following behavior multiple times, the robot 1000 can initiate these behaviors fewer times so that the robot 1000 can clean the region 1006 as well as the areas around the obstacles during one portion of a cleaning mission, rather than during multiple distinct portions of the cleaning mission.

In some implementations, one or more of the obstacles 1010a-1010f can be removed from the environment 1004. If an obstacle is removed, the region 1006 can be adjusted in size, thereby causing an adjustment of the label associated with region 1006. In some implementations, if all of the obstacles 1010a-1010f are removed, the region 1006 no longer exists, and the label can be deleted. Mapping data collected by the robot 1000 in a further cleaning mission can be indicative of the removal of the obstacle or of all the obstacles.

FIGS. 11A-11D illustrate an example of an autonomous mobile robot 1100 (shown in FIG. 11A) that generate mapping data usable by an autonomous mobile robot 1101 (shown in FIG. 11C) for navigating about a floor surface 1102 in an environment 1104. In some implementations, one or both of the robots 1100, 1101 is similar to the robot 100. In some implementations, one of the robots 1100, 1101 is a cleaning robot similar to the robot 100, and the other of the robots 1100, 1101 is an autonomous mobile robot with a drive system and a sensor system similar to the drive system and sensor system of the robot 100.

Figure 11A:
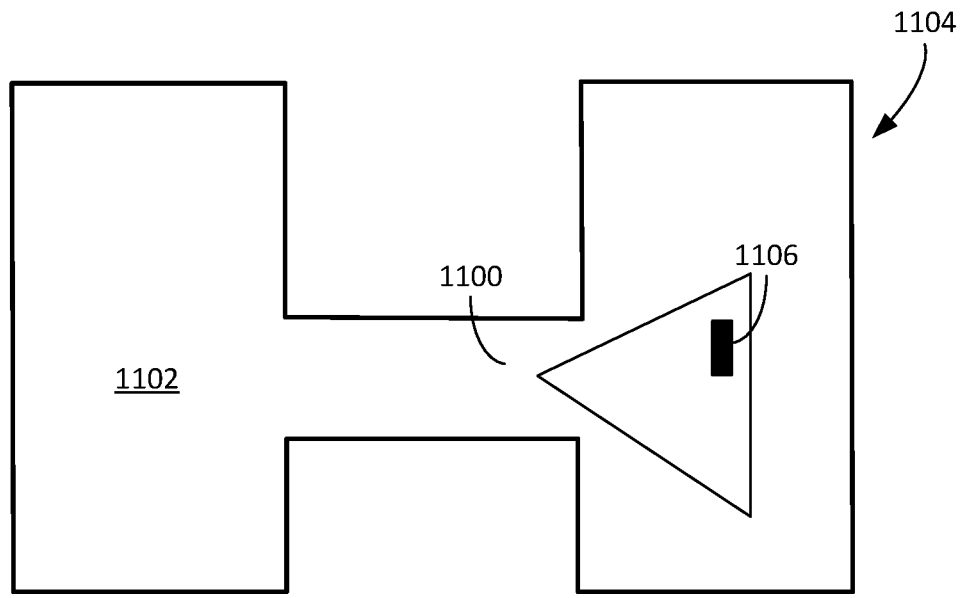
Figure 11B:
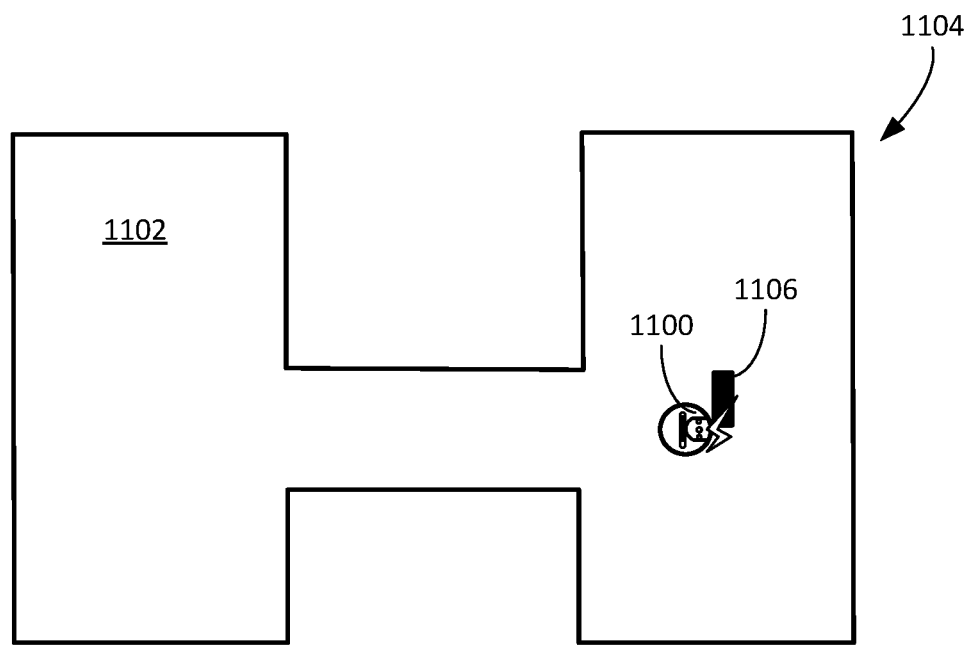

Referring to FIG. 11A, in a first mission, the robot 1100 moves about the floor surface 1102 and detects an object 1106. The robot 1100, for example, detects the object 1106 using an image capture device on the robot 1100. Referring to FIG. 11B, as the robot 1100 continues to move about the floor surface 1102, the robot 1100 contacts the object 1106 and, using an obstacle detection sensor, detects that the object 1106 is an obstacle for the robot 1100. The robot 1100 can then avoid the obstacle and complete its mission. In some implementations, the obstacle detection sensor is triggered without the robot 1100 contacting the object 1106. The obstacle detection sensor can be a proximity sensor or other contactless sensor for detecting obstacles. In some implementations, the obstacle detection sensor of the robot 1100 is triggered by a feature in the environment proximate the object 1106. For example, the object 1106 may be near the feature in the environment that triggers the obstacle detection sensor of the robot 1100, and the robot 1100 can associate the visual imagery captured using the image capture device with the triggering of the obstacle detection sensor.

Mapping data produced by the robot 1100 can include the visual imagery captured the image capture device and the obstacle detection captured by the obstacle detection sensor. A label can be provided on a map indicating that the object 1106 is an obstacle, and can further associate the label with the visual imagery of the object 1106.

Figure 11C:
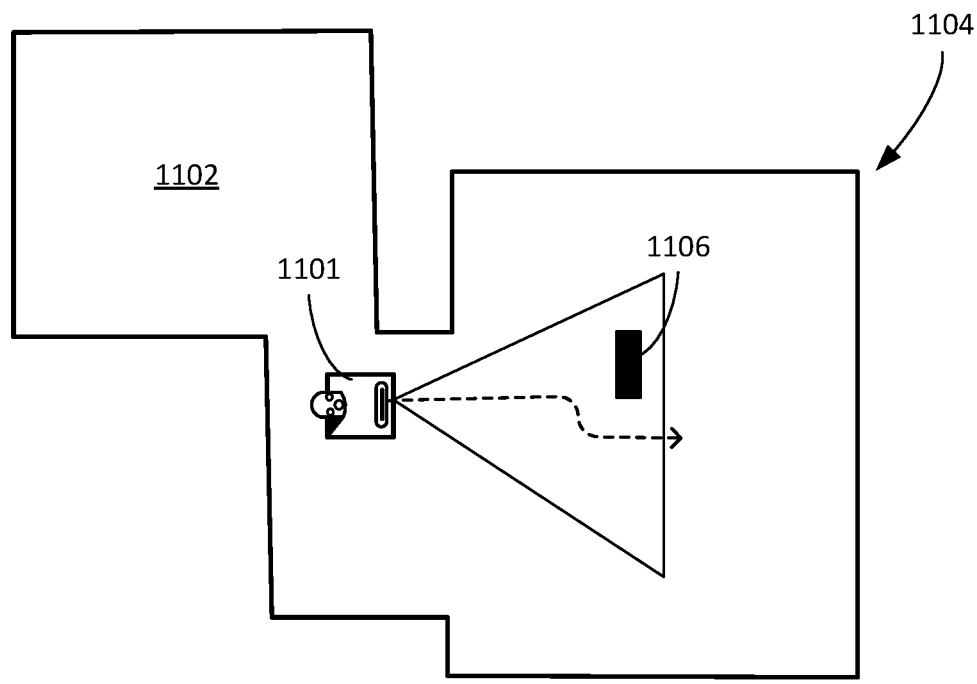
Figure 11D:
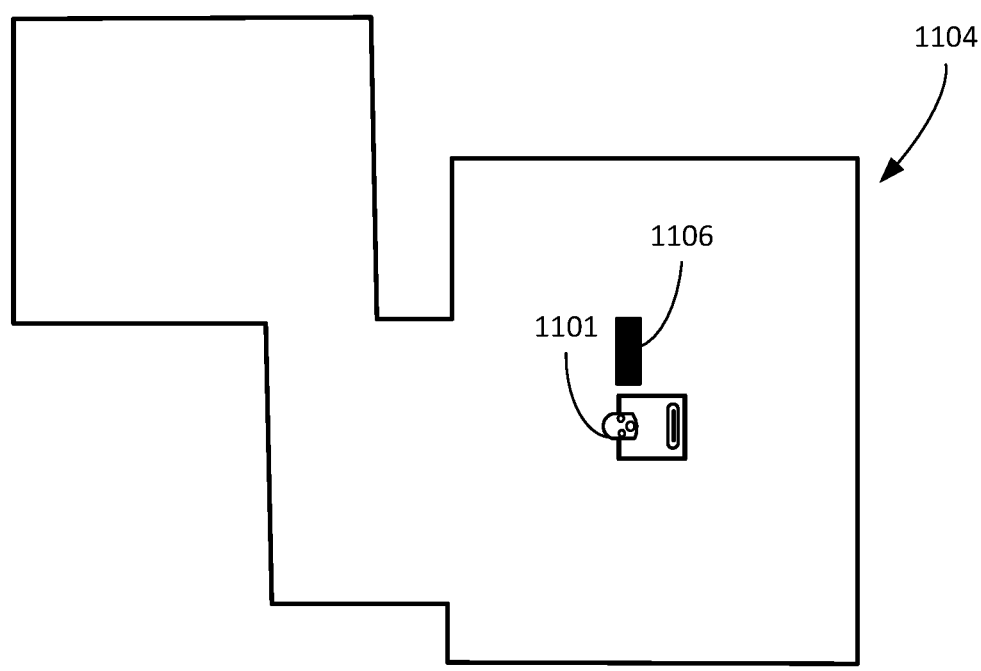

Referring to FIG. 11C, in a second mission, the robot 1101 moves about the floor surface 1102 and detects the object 1106. For example, the robot 1101 can detect the object 1106 using an image capture device on the robot 1101. The visual imagery captured by the image capture device can match the visual imagery associated with the label for the object 1106. Based on this match, the robot 1101 can determine that the object 1106 is an obstacle or can associate detection of the object 1106 by the image capture device with an obstacle avoidance behavior. Referring to FIG. 11D, the robot 1101 can avoid the object 1106 without having to trigger the obstacle detection sensor. For example, if the obstacle detection sensor is a bump sensor, the robot 1101 can avoid the object 1106 without having to contact the obstacle and trigger the bump sensor. In some implementations, the robot 1101 can avoid triggering a bump sensor and can use a proximity sensor to follow along the obstacle. By relying on the map produced from the mapping data collected by the robot 1100, the robot 1101 can avoid certain sensor observations associated with the object 1106, in particular, obstacle detection sensor observations.

In some implementations, a timing of the second mission can overlap with a timing for the first mission. The robot 1101 can be operating in the environment at the same time that the robot 1100 is operating in the environment.

Additional Alternative Implementations

A number of implementations, including alternative implementations, have been described. Nevertheless, it will be understood that further alternative implementations are possible, and that various modifications may be made.

Referring back to FIG. 1B, the indicators 66a-66f are described as providing indications of states, types, and/or locations of features in the environment 20. These indicators 66a-66f can be overlaid on the visual representation 40 of the map of the environment 20. The user device 31 can present other indicators in further implementations. For example, the user device 31 can present a current location of the robot 100, a current location of the docking station 60, a current status of the robot 100 (e.g., cleaning, docked, error, etc.), or a current status of the docking station 60 (e.g., charging, evacuating, off, on, etc.). The user device 31 can also present an indicator of a path of the robot 100, a projected path of the robot 100, or a proposed path for the robot 100. In some implementations, the user device 31 can present a list of the labels provided on the map. The list can include current states and types of the features associated with the labels.

Other labels can also be visually represented by a user device. For example, maps of the environments described with respect to FIGS. 7A-7D, 8A-8B, 9A-9D, 10A-10B, and 11A-11D can be visually represented in a manner similar to the visual representation 40 described with respect to FIG. 1B. In addition, labels described with respect to FIGS. 7A-7D, 8A-8B, 9A-9D, 10A-10B, and 11A-11D can also be visually represented. For example, the locations 706a-706f can be associated with labels, and can be visually represented with indicators overlaid on a visual representation of a map of an environment. The dirty area 708, the door 806, the region 906, the obstacles 1010a-1010f, the region 1006, and the object 1106 can also be visually represented with indicators.

The states of the dirty areas are described as being "high dirtiness," "medium dirtiness," and "low dirtiness" states. Other implementations are possible. For example, in some implementations, the possible states of the dirty areas can include states indicative of different frequencies of dirtiness. For example, a dirty area could have a "dirty daily" state indicating that the dirty area becomes dirty on a daily basis. For a dirty area with this state, based on the label of the dirty area and the "dirty daily" state, an autonomous cleaning robot could initiate a focused cleaning behavior to perform a focused cleaning of the dirty area at least once a day. A dirty area could have a "dirty weekly" state indicating that the dirty area becomes dirty on a weekly basis. For a dirty area with this state, an autonomous cleaning robot could initiate a focused cleaning behavior to perform a focused cleaning of the dirty area at least once a week.

Alternatively or additionally, the possible states of dirty areas can include states indicative of periodicity of dirtiness. For example, a dirty area could have a month-specific dirtiness state in which the dirty area becomes dirty only during a certain month. For a dirty area with this state, based on the label of the dirty area and the month-specific dirtiness state, an autonomous cleaning robot could initiate a focused cleaning behavior to perform a focused cleaning of the dirty area only during the specified month. A dirty area could have a seasonal dirtiness state in which the dirty area becomes dirty only during a specific season, e.g., spring, summer, autumn, winter. For a dirty area with this state, based on the label of the dirty area and the seasonal dirtiness state, an autonomous cleaning robot could initiate a focused cleaning behavior to perform a focused cleaning of the dirty area only during the specified season.

Focused cleaning behaviors may vary in implementations. In some implementations, a focused cleaning behavior may involve increasing a vacuum power of the robot. For example, the vacuum power of the robot can be set to two or more different levels. In some implementations, the focused cleaning behavior may involve decreasing a speed of the robot such that the robot spends more time in a particular area. In some implementations, the focused cleaning behavior may involve passing through a particular area multiple times to attain a better clean of the area. In some implementations, the focused cleaning behavior may involve a particular cleaning pattern, e.g., a series of substantially parallel rows covering the particular area to be cleaned, or a spiral pattern to cover the particular area to be cleaned.

The labels described herein can vary in implementations. In some implementations, the labels can be associated with different floor types in the environment. For example, a first label can be associated with a portion of the floor surface that includes a carpet floor type, and a second label can be associated with a portion of the floor surface that includes a tile floor type. A first autonomous cleaning robot can initiate a navigational behavior based on the first and second labels in which the first robot moves onto and cleans both the carpet and the tile. The first robot can be a vacuum robot suitable for cleaning both types of floor types. A second autonomous cleaning robot can initiate a navigational behavior based on the first and second labels in which the second robot moves onto and cleans only the tile. The second robot can be a wet cleaning robot that is not suitable for cleaning carpets In some implementations, certain objects in the environment can be correlated with certain labels such that a label can be provided in response to mapping data indicative of the object. For example, as described herein, a label for a dirty area can be provided on a map in response to mapping data indicative of detection of debris. In some implementations, an object can have a type that is associated with a dirty area. In response to detection of the object, e.g., by an autonomous mobile robot, an image capture device on the robot, or an image capture device in the environment, the label for the dirty area can be provided on the map. When a new object of the same type is moved into the environment, a new label for a dirty area can be provided on the map. Similarly, if the robot is moved to a new environment and is operated in the new environment, the map created for the new environment can be automatically populated with labels for dirty areas based on detection of objects of the same type. For example, the object could be a table, and a label associated with a dirty area could be provided on the map in response to detection of other tables in the environment. In another example, the object could be a window, and a label and a label associated with a dirty area could be provided on the map in response to detection of other windows in the environment.

The type of the object can be associated with the dirty area automatically through detection by devices in the environment. For example, the cloud computing system can determine that dirty areas detected using the debris detection sensors are correlated with detection of tables in the environment by image capture devices in the environment. The cloud computing can, based on this determination, provide labels associated with dirty areas in response to receiving data indicative of new tables added to the environment. Alternatively or additionally, the type of the object can be associated with the dirty area manually. For example, a user can provide a command to correlate a certain object, e.g., tables, with dirty areas such that detection of tables causes a label for a dirty area to be provided on the map. Alternatively or additionally, a user can provide instructions to perform focused cleanings in areas on the floor surface of the environment. The cloud computing system can, in some implementation, determine that the areas correspond to areas covered or near a certain type of object in the environment. The cloud computing system can accordingly correlate the user-selected areas for focused cleaning with the type of object such that detection of an object with this type results in creation of a label associated with a focused cleaning behavior.

In some implementations, before a label is provided, a user confirmation is requested. For example, the robot or the mobile device presents a request for user confirmation, and the user provides the request through a user input on the robot or the mobile device, e.g., a touchscreen, a keyboard, buttons, or other appropriate user inputs. In some implementations, a label is automatically provided, and a user can operate the robot or the mobile device to remove the label.

In the example described with respect to FIGS. 8A-8B, the robot 800 can transmit data to cause a request to change a state of a door to be issued to the user. In other implementations, an autonomous cleaning robot can transmit data to cause a request to change a state of another object in the environment to be issued to the user. For example, the request can correspond to a request to move an obstacle, to reorient an obstacle, to reposition an area rug, to unfurl a portion of an area rug, or to adjust a state of another object.

While an autonomous cleaning robot has been described herein, other mobile robots may be used in some implementations. For example, the robot 100 is a vacuum cleaning robot. In some implementations, an autonomous wet cleaning robot can be used. The robot can include a pad attachable to a bottom of the robot, and can be used to perform cleaning missions in which the robot scrubs the floor surface. The robot can include systems similar to those described with respect to the robot 100. In some implementations, a patrol robot with an image capture device can be used. The patrol robot can include mechanisms to move the image capture device relative to a body of the patrol robot. While the robot 100 is described as a circular robot, in other implementations, the robot 100 can be a robot including a front portion that is substantially rectangular and a rear portion that is substantially semicircular. In some implementations, the robot 100 has an outer perimeter that is substantially rectangular.

The robot 100 and some other robots described herein are described as performing cleaning missions. In some implementations, the robot 100 or another autonomous mobile robot in the environment 20 another type of mission. For example, the robot can perform a vacuuming mission to operate a vacuum system of the robot to vacuum debris on a floor surface of the environment. The robot can perform a patrol mission in which the robot moves across the floor surface and captures imagery of the environment that can be presented to a user through a remote mobile device.

Certain implementations are described herein with respect to multiple cleaning missions, in which in a first cleaning mission an autonomous cleaning robot generates mapping data indicative of a feature, and a label is then provided based on the mapping data. For example, FIGS. 7A-7D are described with respect to a first cleaning mission and a second cleaning mission. In some implementations, the robot 700 is capable of performing the focused cleaning behavior described with respect to FIGS. 7C and 7D in the same cleaning mission that the robot 700 detects the dirty area 708 as described with respect to FIGS. 7A and 7B. For example, the robot 700 could detect sufficient debris at the locations 706a-706f, and a label could be provided for the dirty area 708 in the course of a single cleaning mission. The robot 700, during this single cleaning mission, could move over the dirty area 708 again after initially detecting the debris at the locations 706a-706f and after the label is provided for the dirty area 708. The robot 700 could then initiate the focused cleaning behavior discussed with respect to FIG. 7C. In some implementations, the robot 700, after covering most of the traversable portions of the floor surface 702, can move specifically over the dirty area 708 again in the same cleaning mission that the robot 700 initially detected the debris at the locations 706a-706f. In this regard, the focused cleaning behavior described with respect to FIG. 7D could be performed during the same cleaning mission that the locations 706a-706f are detected and used to provide a label for the dirty area 708. Similarly, referring back to FIG. 1A, the labels for the dirty areas 52a, 52b, 52c could be provided during the same cleaning mission that the dirty areas 52a, 52b, 52c are initially detected. The robot 100 can return to these areas during the same cleaning mission and initiate the focused cleaning behaviors based on the labels for these dirty areas 52a, 52b, 52c.

Referring back to FIGS. 8A-8B, the robot 800 is encountering the door 806 in the second cleaning mission. In some implementations, the robot 800 can encounter the door 806 in the first cleaning mission. For example, the robot 800 can encounter the door 806 in the same cleaning mission that the robot 800 moved from the first room 808 into the second room 812 without encountering the door 806. The robot 800 can encounter the door 806 on a second pass through the environment 804. The door 806 can, during the first cleaning mission, be moved from its open state to its closed state. As a result, the state of the door 806 as labeled on the map can change during the course of the first cleaning mission, and the robot 800 can adjust its behavior accordingly in the first cleaning mission.

FIGS. 9A-9D are described with respect to first through fourth cleaning missions. In some implementations, the behaviors described with respect to FIGS. 9A-9D can occur during three or fewer cleaning missions. For example, the robot 900 can attempt to cross or cross the region 906 multiple times during a single cleaning mission. The robot 900 can perform the behavior described with respect to FIG. 9D in the same cleaning mission that the robot 900 initially crossed the region 906 successfully (as described with respect to FIG. 9A) and attempted to cross the region 906 unsuccessfully (as described with respect to FIGS. 9B and 9C).

Referring to FIGS. 10A-10B, the robot 1000 can perform the behavior described with respect to FIG. 10B in the same cleaning mission that the robot 1000 performs the first navigational behavior described with respect to FIG. 10A. The robot 100 can, for example, move about the environment 1004 a second time in the first cleaning mission and move through the region 1006 in the manner described with respect to FIG. 10B to more quickly clean the region 1006.

In some implementations, mapping data produced by a first robot, e.g., the robot 100, the robot 700, the robot 800, the robot 900, the robot 1000, or the robot 1100, can be produced to construct the map and to label the map, and then a second autonomous mobile robot can access the map to initiate a behavior as described herein. The first robot can generate the mapping data in a first mission, and the second robot can access the map produced from the mapping data to use during a second mission for controlling a behavior of the second robot. The first mission and the second mission can overlap in time. For example, an end time of the first mission can be after a start time of the second mission.

In some implementations, a user device presents indicators overlaid on imagery of the environment. For example, in an augmented reality mode, an image of the environment can be presented on the user device, and indicators similar to those described herein can be overlaid on the image of the environment.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the mobile device, a cloud computing system configured to communicate with the mobile device and the autonomous cleaning robot, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or another unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and operating techniques described herein may be applicable to controlling other mobile robots aside from cleaning robots. For example, a lawn mowing robot or a space-monitoring robot may be trained to perform operations in specific portions of a lawn or space as described herein.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

A number of implementations have been described. Nevertheless, it will be understood that various modifications may be made. Accordingly, other implementations are within the scope of the claims.

What is claimed is:

1. A method comprising:
   during a first navigation associated with a region of an environment by an autonomous cleaning robot, navigating the autonomous cleaning robot relative to the region using one or more first navigational parameters, wherein the region is elevated relative to an adjoining region;
   constructing a map of the environment based on mapping data produced by the autonomous cleaning robot during the first navigation, wherein constructing the map comprises providing
      a label indicating that the region is elevated relative to the adjoining region, and
      in association with the label, data indicative of the one or more first navigational parameters; and
   navigating the autonomous cleaning robot through the region using one or more second navigational parameters, wherein the one or more second navigational parameters are based on the label and based on the one or more first navigational parameters used during the first navigation associated with the region by the autonomous cleaning robot.

2. The method of claim 1, comprising:
   during a second navigation associated with the region by the autonomous cleaning robot, navigating the autonomous cleaning robot relative to the region using one or more third navigational parameters; and
   determining that a navigation condition of the second navigation is satisfied,
   wherein constructing the map comprises providing, in association with the label, data indicative of the one or more third navigational parameters and the navigation condition.

3. The method of claim 2, wherein, based on the navigation condition being satisfied, the one or more second navigational parameters are selected to be different from the one or more third navigational parameters.

4. The method of claim 2, wherein the navigation condition comprises an error condition.

5. The method of claim 4, comprising identifying the error condition based on data from a cliff sensor of the autonomous cleaning robot.

6. The method of claim 1, wherein the one or more second navigational parameters comprise the one or more first navigational parameters.

7. The method of claim 2, wherein the first navigation comprises navigation through the region, and
   wherein the navigation condition comprises that, during the second navigation, the autonomous cleaning robot is prevented from navigating through the region.

8. The method of claim 1, comprising:
   determining, based on the label and based on the one or more first navigational parameters, a range of navigational parameter values; and
   determining the one or more second navigational parameters based on the range of navigational parameter values.

9. The method of claim 1, comprising:
   causing a remote computing device to present a visual representation of the environment based on the map and a visual indicator of the label.

10. The method of claim 1, wherein the one or more first navigational parameters comprise at least one of an angle of approach relative to the region, a speed, an acceleration, or a specific trajectory through the region.

11. The method of claim 1, wherein the label indicates that the region comprises an elevated threshold between a first room and a second room, and
    wherein navigating the autonomous cleaning robot in the region comprises navigating the autonomous cleaning robot from the first room to the second room over the threshold using the one or more second navigational parameters.

12. The method of claim 1, wherein the first navigation occurs during a first cleaning mission, and wherein navigation using the one or more second navigational parameters occurs during a second cleaning mission.

13. An autonomous cleaning robot comprising:
    a drive system to support the autonomous cleaning robot above a floor surface in an environment, the drive system configured to move the autonomous cleaning robot about the floor surface;
    a cleaning assembly to clean the floor surface as the autonomous cleaning robot moves about the floor surface;
    a sensor system; and
    a controller operably connected to the drive system, the cleaning assembly, and the sensor system, the controller configured to execute instructions to perform operations comprising:
    during a first navigation associated with a region of the environment by the autonomous cleaning robot, using the drive system to navigate the autonomous cleaning robot relative to region using one or more first navigational parameters, wherein the region is elevated relative to an adjoining region;
    constructing a map of the environment based on mapping data produced by the autonomous cleaning robot during the first navigation, wherein constructing the map comprises providing
       a label indicating that the region is elevated relative to the adjoining region, and
       in association with the label, data indicative of the one or more first navigational parameters; and
    using the drive system to navigate the autonomous cleaning robot through the relative to region using one or more second navigational parameters, wherein the one or more second navigational parameters are based on the label and based on the one or more first navigational parameters used during the first navigation associated with the region by the autonomous cleaning robot.

14. The autonomous cleaning robot of claim 13, wherein the operations comprise:
during a second navigation associated with the region by the autonomous cleaning robot, using the drive system to navigate the autonomous cleaning robot relative to the region using one or more third navigational parameters; and
determining that a navigation condition of the second navigation is satisfied,
wherein constructing the map comprises providing, in association with the label, data indicative of the one or more third navigational parameters and the navigation condition.

15. The autonomous cleaning robot of claim 14, wherein, based on the navigation condition being satisfied, the one or more second navigational parameters are selected to be different from the one or more third navigational parameters.

16. The autonomous cleaning robot of claim 14, wherein the navigation condition comprises an error condition.

17. The autonomous cleaning robot of claim 16, wherein the sensor system comprises a cliff sensor, and wherein the operations comprise identifying the error condition based on data from the cliff sensor.

18. The autonomous cleaning robot of claim 14, wherein the first navigation comprises navigation through the region, and wherein the navigation condition comprises that, during the second navigation, the autonomous cleaning robot is prevented from navigating through the region.

19. The autonomous cleaning robot of claim 13, wherein the one or more second navigational parameters comprise the one or more first navigational parameters.

20. The autonomous cleaning robot of claim 13, wherein the operations comprise:
determining, based on the label and based on the one or more first navigational parameters, a range of navigational parameter values; and
determining the one or more second navigational parameters based on the range of navigational parameter values.

21. The autonomous cleaning robot of claim 13, wherein the operations comprise:
causing a remote computing device to present a visual representation of the environment based on the map and a visual indicator of the label.

22. The autonomous cleaning robot of claim 13, wherein the one or more first navigational parameters comprise at least one of an angle of approach relative to the region, a speed, an acceleration, or a specific trajectory through the region.

* * * * *

UNITED STATES PATENT AND TRADEMARK OFFICE
CERTIFICATE OF CORRECTION

| | | |
|---|---|---|
| PATENT NO. | : 11,966,227 B2 | |
| APPLICATION NO. | : 17/671183 | |
| DATED | : April 23, 2024 | |
| INVENTOR(S) | : Mario Munich et al. | |

It is certified that error appears in the above-identified patent and that said Letters Patent is hereby corrected as shown below:

In the Claims

Column 34, Line 64, Claim 13 – after "the" delete "relative to".

Signed and Sealed this
Thirtieth Day of July, 2024

Katherine Kelly Vidal
*Director of the United States Patent and Trademark Office*